Oct. 25, 1955 M. H. HAMMER ET AL 2,721,737

COLLATING MACHINE

Filed May 23, 1952 17 Sheets-Sheet 1

MARVIN H. HAMMER
LYLE V. DUTRO
SHERMAN H. HEWSON
INVENTORS

BY

Mellin and Hanscom
ATTORNEYS

Oct. 25, 1955 M. H. HAMMER ET AL 2,721,737

COLLATING MACHINE

Filed May 23, 1952 17 Sheets-Sheet 2

MARVIN H. HAMMER
LYLE V. DUTRO
SHERMAN H. HEWSON
INVENTORS

BY

Meelen and Hanscom

ATTORNEYS

MARVIN H. HAMMER
LYLE V. DUTRO
SHERMAN H. HEWSON
INVENTORS

BY

Mellin and Hanscom

ATTORNEYS

Oct. 25, 1955 M. H. HAMMER ET AL 2,721,737

COLLATING MACHINE

Filed May 23, 1952 17 Sheets-Sheet 4

MARVIN H. HAMMER
LYLE V. DUTRO
SHERMAN H. HEWSON
INVENTORS

BY

Mellin and Hanscom

ATTORNEYS

MARVIN H. HAMMER
LYLE V. DUTRO
SHERMAN H. HEWSON
INVENTORS

BY

Mellin and Hanscom

ATTORNEYS

MARVIN H. HAMMER
LYLE V. DUTRO
SHERMAN H. HEWSON
INVENTORS

BY

Mellin and Hanscom
ATTORNEYS

MARVIN H. HAMMER
LYLE V. DUTRO
SHERMAN H. HEWSON
INVENTORS

BY
Mellin and Hanscom
ATTORNEYS

MARVIN H. HAMMER
LYLE V. DUTRO
SHERMAN H. HEWSON
INVENTORS

BY
Mellin and Hanscom
ATTORNEYS

MARVIN H. HAMMER
LYLE V. DUTRO
SHERMAN H. HEWSON
INVENTORS

BY

Mellin and Hanscom
ATTORNEYS

MARVIN H. HAMMER
LYLE V. DUTRO
SHERMAN H. HEWSON
INVENTORS

BY

Meelin and Hanscom

ATTORNEYS

MARVIN H. HAMMER
LYLE V. DUTRO
SHERMAN H. HEWSON
INVENTORS

BY
Mellin and Hanscom
ATTORNEYS

COLLATING MACHINE

Filed May 23, 1952

MARVIN H. HAMMER
LYLE V. DUTRO
SHERMAN H. HEWSON
INVENTORS

BY

Mellin and Hanscom
ATTORNEYS

COLLATING MACHINE

Filed May 23, 1952

MARVIN H. HAMMER
LYLE V. DUTRO
SHERMAN H. HEWSON
INVENTORS

BY

Mellin and Hanscom
ATTORNEYS

MARVIN H. HAMMER
LYLE V. DUTRO
SHERMAN H. HEWSON
INVENTORS

BY

Mellin and Hanscom

ATTORNEYS

Oct. 25, 1955 M. H. HAMMER ET AL 2,721,737

COLLATING MACHINE

Filed May 23, 1952 17 Sheets-Sheet 15

MARVIN H. HAMMER
LYLE V. DUTRO
SHERMAN H. HEWSON
INVENTORS

BY

Meelin and Hanscom

ATTORNEYS

MARVIN H. HAMMER
LYLE V. DUTRO
SHERMAN H. HEWSON
INVENTORS

BY

Mellin and Hanscom
ATTORNEYS

MARVIN H. HAMMER
LYLE V. DUTRO
SHERMAN H. HEWSON
INVENTORS

BY
Mellin and Hanscom
ATTORNEYS

④ United States Patent Office 2,721,737
Patented Oct. 25, 1955

2,721,737

COLLATING MACHINE

Marvin H. Hammer, Phoenix, Ariz., and Lyle V. Dutro, La Canada, and Sherman H. Hewson, La Crescenta, Calif.; said Dutro and said Hewson assignors to said Hammer Application May 23, 1952, Serial No. 289,564

38 Claims. (Cl. 270—58)

This invention relates to sheet collating machines and has as its principal object the provision of an improved sheet collating machine.

More particular objects of the present invention are to provide a collating machine wherein a plurality of sheets are picked up and collated by a rotary sheet collecting drum, the sheets during their accumulation on the drum having adhesive material applied to selected portions thereof to cause adherence of the accumulated sheets together; to provide a design wherein the sheets are fed to the rotary drum at different circumferential places therearound, and which sheets are so disposed relative to the drum that they are picked up and held on the drum in staggered fashion, allowing adhesive material to be applied substantially simultaneously to pairs of the sheets; to provide a design peculiarly adapted for but not restricted to the production of business forms, pads, manifolds, pamphlets, and the like, wherein carbon sheets are interleaved in or form the alternate sheets of such articles; to provide a machine having incorporated therein an emergency control system operable, upon improper feeding of a sheet to be picked up, to temporarily inactivate certain of the mechanisms of the machine until the defect is corrected, and then functioning to re-activate such mechanisms to insure proper collating of sheets.

Other objects of the present invention are as follows: to provide in a collating machine of the type generally set out above improved feeding means for feeding sheets to a rotary sheet collecting drum; to provide in such a machine a novel rotary collecting drum having sheet impaling or pickup pins arranged to impale sheets to pick up the same, and which machine includes a regular control system for, among other things, tilting the pins to a releasing position to enable the drum to be stripped of its accumulated sheets by a novel stripping mechanism; to provide in such a machine a novel sheet delivery mechanism for gripping stripped accumulated sheets and delivering the same to a delivery stack, and while so doing to draw the same through a slitting mechanism to divide the accumulated sheets into several portions.

Various other objects of the present invention will be apparent from the following description taken in connection with the accompanying drawings wherein.

*General description*

Figure 1:
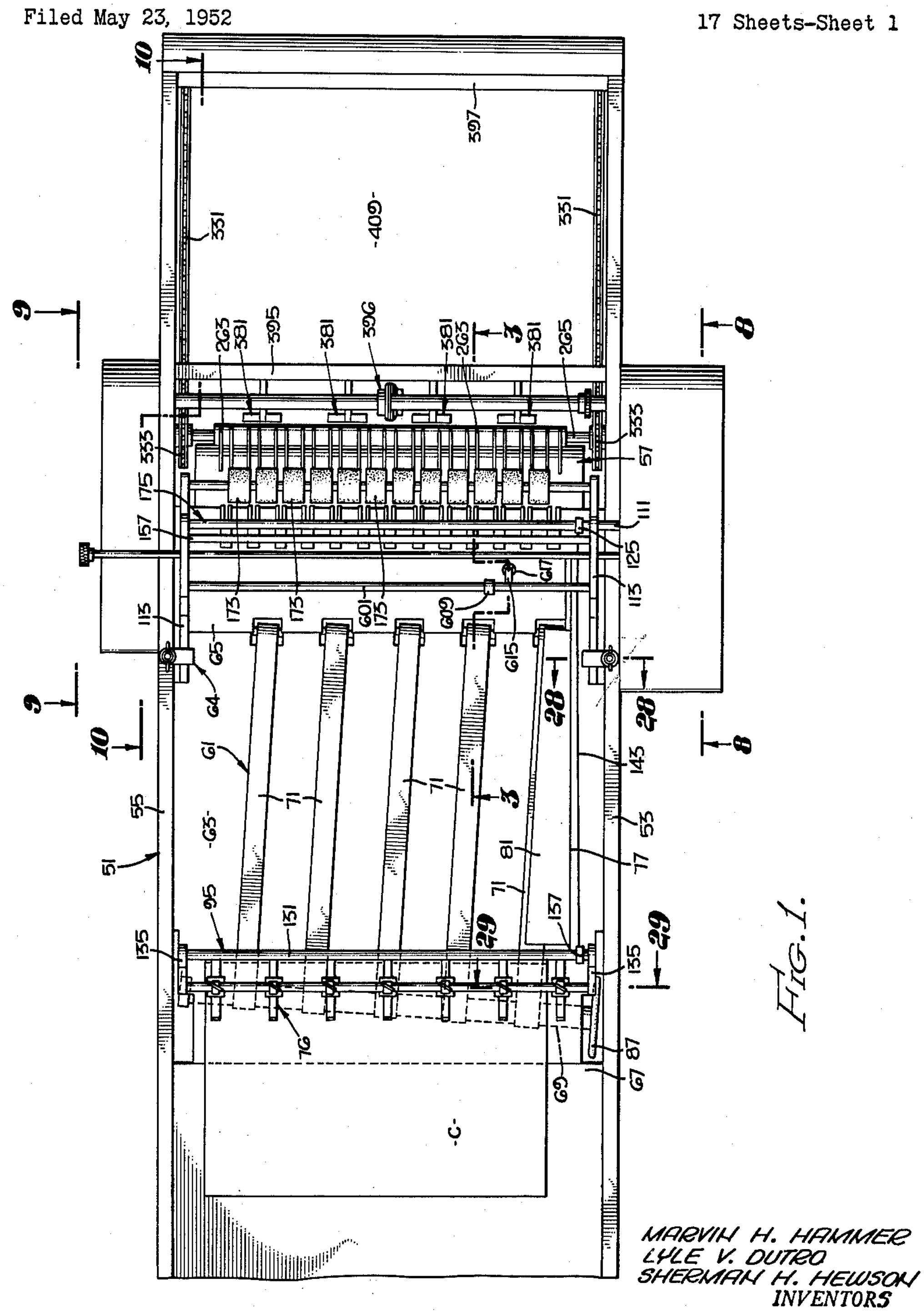
Fig. 1 is a top plan view of a collating machine embodying the concepts of the present invention.

The broad purpose of the collating machine of the present invention is to collect a plurality of sheets in a predetermined registered fashion while simultaneously adhesively bonding the sheets together, and then preferably slitting the bonded sheets into several or more portions. The machine of the present invention is ideally suited for collecting a plurality of sheets in which the alternate sheets thereof are of a special or particular kind, for instance, carbon sheets, and although the disclosed embodiment of the invention is designed for interleaving carbon sheets in sets of paper sheets, the invention is not intended to be limited by such a description, such description being given to show a practical application of the concepts of the present invention.

The general description of the particular machine disclosed is as follows: the machine includes a feed table to which is fed in successive fashion, either manually or automatically, a plurality of paper sheets, said sheets being fed across the feed table by conveying means on the table. At the delivery end of the feed table is rotatably mounted a sheet collecting drum, which is adapted to receive at the upper peripheral portion thereof the above mentioned sheets in successive fashion from the feed table. Governing the delivery of sheets to the sheet collecting drum in timed relation to rotation thereof is a gate type paper sheet control mechanism.

Adjacent the sheet collecting drum at a lower level is a stack of carbon sheets and a carbon sheet feeding mechanism operable in timed relation to operation of the drum to successively deliver carbon sheets to the drum, whereby, upon each revolution of the drum, a paper sheet is first picked up and then a carbon sheet and then a paper sheet and so on until a predetermined cycle has been completed. During rotation of the drum, an adhesive material applying mechanism functions to apply adhesive material to the sheets being accumulated on the drum, so that the sheets are temporarily bonded together, and will be permanently bonded together upon drying of the adhesive material.

There is a sheet stripping mechanism operable in timed relation to rotation of the drum and so actuated as to engage the drum after the accumulation of a predetermined number of sheets to strip the accumulated sheets from the drum. Also operable in timed relation to rotation of the drum and the sheet stripping mechanism is a sheet delivery mechanism including reciprocable grippers for gripping each stripped accumulated set of sheets just after they have been stripped and drawing the same through a slitting mechanism. Adjacent the line of travel of the grippers is a releasing device adapted to release the divided accumulated set of sheets which they are deposited into a delivery magazine.

Incorporated in the machine is an emergency control system for temporarily stopping operation of various mechanisms of the machine upon the failure of the supply of a paper sheet or a carbon sheet to the drum, so that improper collating of sheets is prevented.

*Paper sheet feeding mechanism*

The collating machine includes a frame generally entitled 51 of more or less conventional construction, including two main side frame members 53 and 55, which assume the form of plates and support most of the various mechanisms of the machine. Side frame members 53 and 55 are rigidly connected in spaced relation by various cross members forming component parts of the various mechanisms of the machine, which cross members will be described hereinafter along with the description of said mechanisms.

Figure 2:
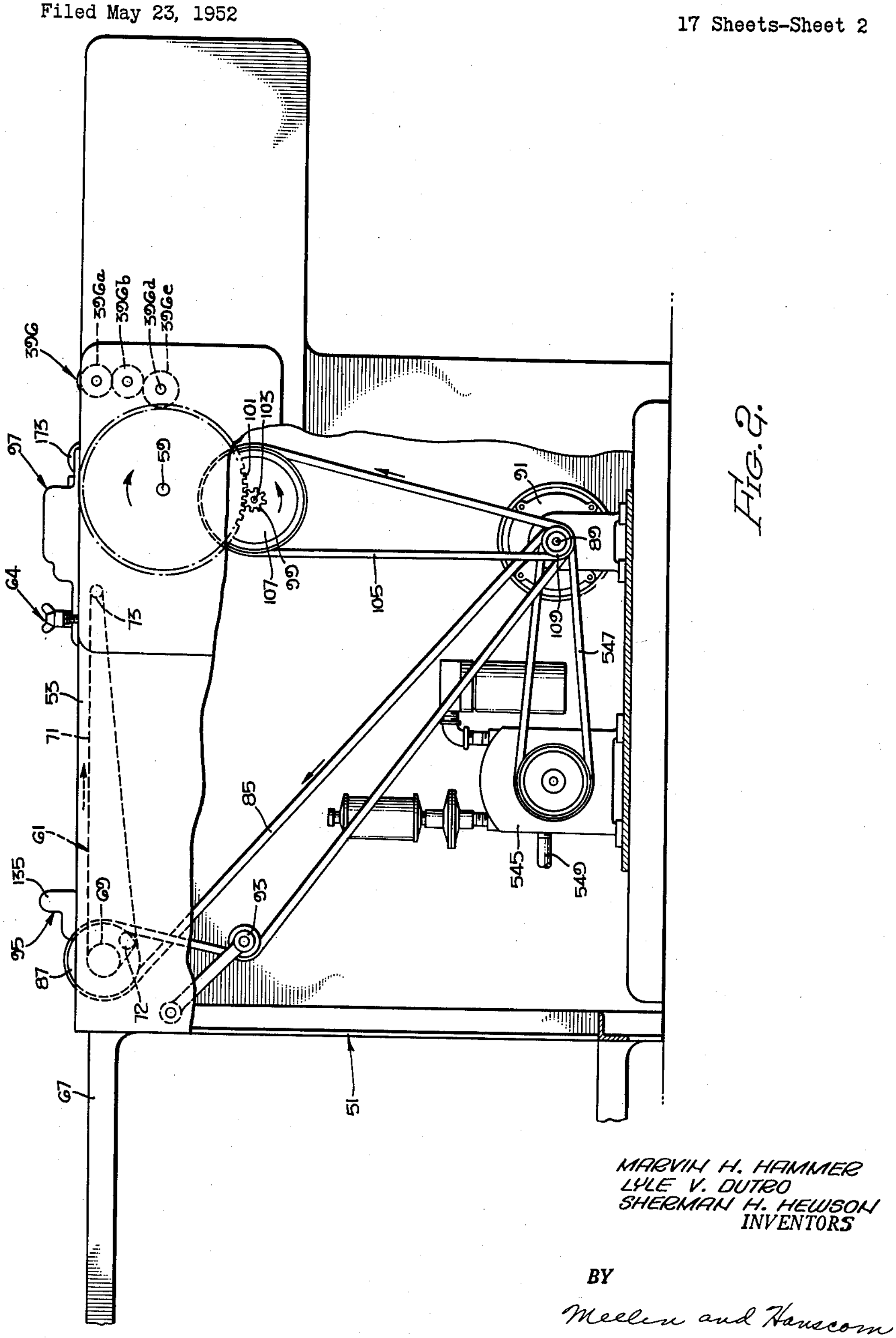
Fig. 2 is a side elevational view of the machine disclosed in Fig. 1, with parts broken away to better show the drives to the principal mechanisms of the machine.
Figure 3:
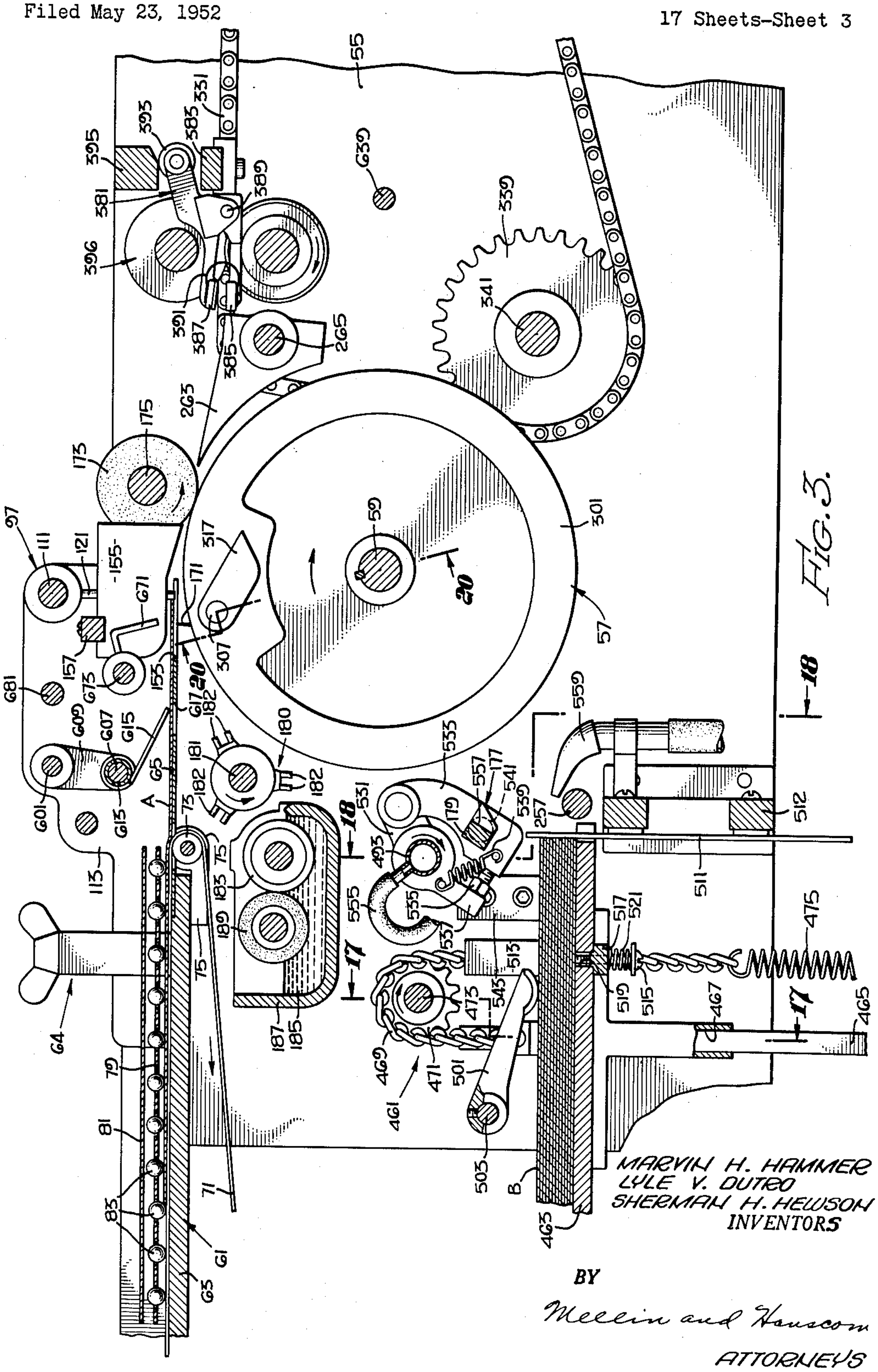
Fig. 3 is a sectional view in side elevation taken along line 3—3 of Fig. 1 in the direction indicated, showing in detail some of the principal operating mechanisms of the machine.
Figure 15:
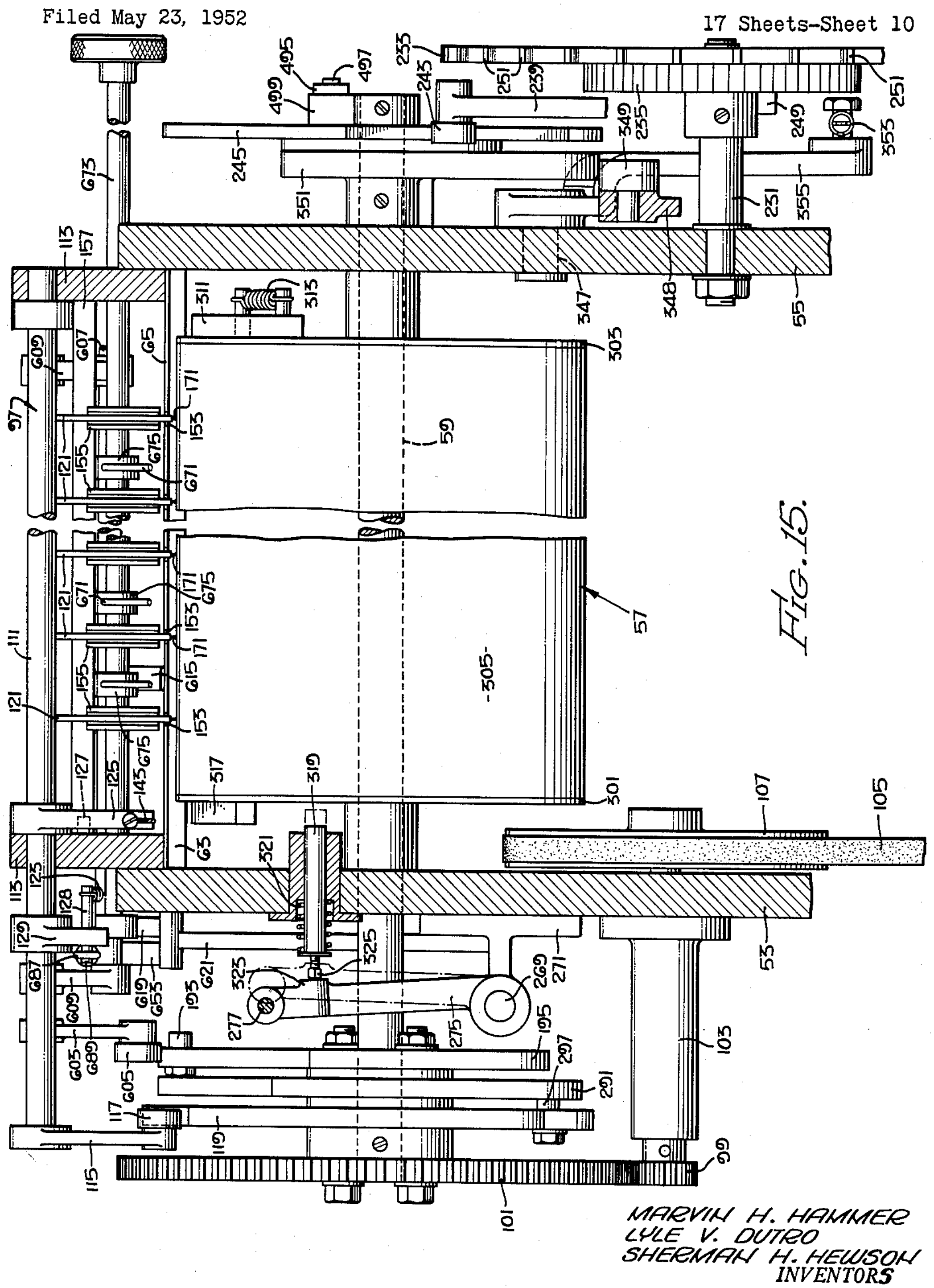
Fig. 15 is a vertical transverse sectional view through the machine taken along line 15—15 of Fig. 8 in the direction of the feed table, showing among other things the drive to the sheet collecting drum and the location of the cams for controlling the operation of the other primary mechanisms of the machine.

Referring to Figs. 3 and 15, between side frame members 53 and 55 is a sheet collecting drum 57 having a supporting shaft 59, to which the drum is keyed, journaled in said side frame members. Adapted to feed sheets of paper in successive fashion substantially tangentially to the upper portion of the drum 57 is a paper sheet feeding mechanism generally entitled 61 (see Fig. 2). This mechanism includes a feed table 63 disposed between side frame members 53 and 55, and pivoted at its rear end, in a manner to be described hereinafter, and supported at its forward end for vertical adjustment by two laterally spaced adjustment devices 64 (compare Figs. 1 and 28). For purposes of convenience in description, the end of the machine toward which the sheets are being fed will be regarded as the forward end of the machine and the opposite end of the machine will be referred to as the rear end of the machine. Specifically, in Fig. 1 the lefthand end of the machine is the rear end and the righthand end is the forward end.

Forming a forward extension of feed table 63 is a straddle plate 65 secured at its rear end to the forward end of feed table 63 and movable in unison with the feed table upon adjustment of adjustment devices 64. The reason for adjusting the position of the feed table assembly will be explained hereinafter. The forward end of straddle plate 65 is the take-off point for paper sheets which are picked up by sheet collecting drum 57, and may be regarded as a paper sheet pickup station. There is also preferably provided a fixed rearward extension 67 for feed table 63, said rear extension being secured to frame 51.

Adjacent the rear end of feed table 63 is a belt driving roll 69 (see Figs. 2 and 29) rotatably suspended from the feed table and about which are trained the rearward ends of a plurality of sheet conveying belts 71. The upper reach of each conveying belt is disposed next to the upper surface of feed table 63 and the lower reach of each belt extends beneath the table (see Fig. 3) and under an idler roll 72 (see Fig. 2). Supporting the forward ends of sheet conveying belts 71 are a plurality of rollers 73 individually rotatably supported from the forward end of feed table 63 by bearing brackets 75. As is apparent from Fig. 1, belts 71 are arranged at a slight angle to the length of the table for a purpose to be described, and to so arrange the belts, roll 69 is supported with its axis normal to the length of the belts and at a slight angle to the breadth of the machine.

Paper sheets are adapted to be fed in successive fashion to the rear ends of conveying belts 71, either manually or automatically, and when so fed are frictionally engaged by the belts and fed forwardly toward the sheet collecting drum 57. There is a ball type sheet hold-down device 76 provided adjacent the rear end of table 63 (compare Figs. 1 and 29), for holding down sheets conveyed to belts 71 and for increasing the frictional force between the sheets and the belts.

Figures 28, 29:
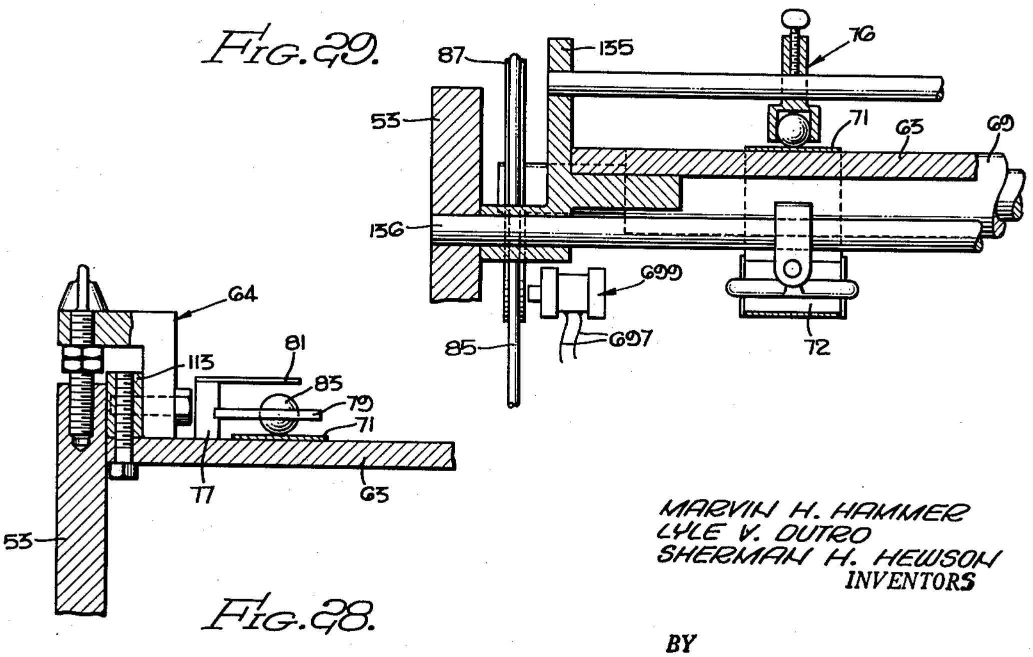
Fig. 28 is a fragmentary vertical sectional view taken along line 28—28 of Fig. 1, showing the arrangement for vertically adjusting the auxiliary frame.
Fig. 29 is a fragmentary vertical sectional view taken along line 29—29 of Fig. 1, showing among other things a sheet hold-down mechanism and the drive to the paper sheet conveying belts.

Secured to feed table 63 adjacent the gear side thereof is a guide strip 77 (compare Figs. 1 and 28). Because of the somewhat diagonal disposition of belts 71, the conveying belts function to bring each paper sheet against the guide strip 77 to predispose the sheet laterally of the machine and relative to mechanisms located forwardly of the guide strip.

Secured to guide strip 77 is a ball spacing strip 79 and a ball retainer strip 81. Spaced by strip 79 and retained by strip 81 are a row of balls 83, preferably assuming the form of glass marbles, supported by the conveying belt located closest the gear side of the machine, as is apparent in Fig. 28. The marbles are adapted to engage the upper face of the guided margin of each sheet and hold the same down, and naturally function to increase the frictional force between the just-mentioned belt and each sheet for forward conveying movement thereof.

Arranged to drive belt-driving roll 69 is a belt 85 trained over a pinch brake-type pulley unit 87, mounted on roll 69, and over a pulley mounted on the shaft 89 of a main driving motor 91. Pulley unit 87 will be discussed more in detail hereinafter. A tension device 93 of conventional design engages belt 85 to maintain proper tension thereon. Motor 91 is mounted on the base of frame 51.

Figure 24:
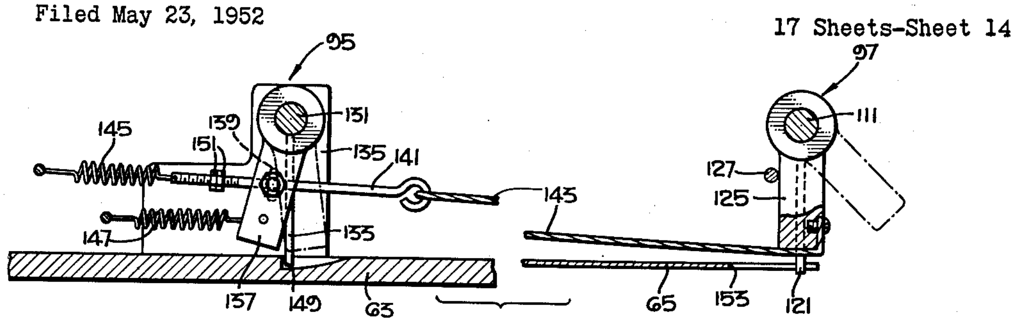
Fig. 24 is a vertical longitudinal sectional view showing the relationship of and the drive between the paper sheet releasing gate and the paper sheet timing gate.
Figure 36:
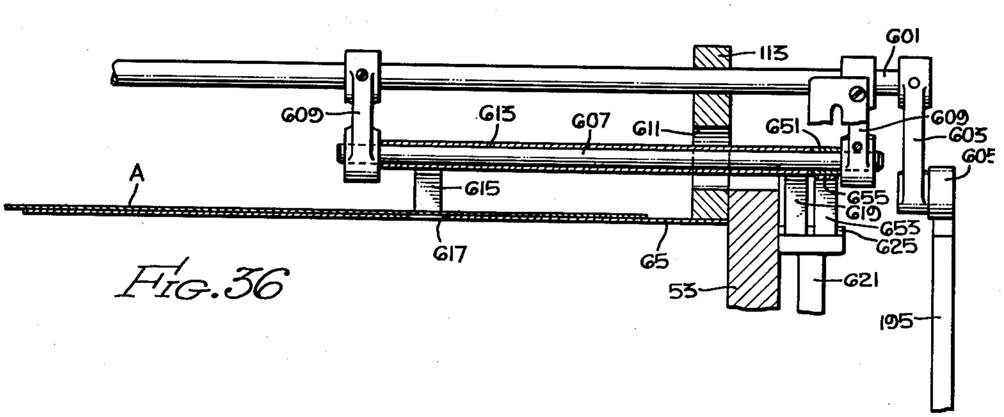
Fig. 36 is a fragmentary vertical transverse sectional view taken along line 36—36 of Fig. 8, showing part of the emergency control system.

Disposed immediately forward of the rear ends of belts 71 is a timing gate mechanism generally entitled 95, and disposed at the forward end of straddle plate 65 is a releasing gate mechanism generally entitled 97 (compare Figs. 1 and 24). These gate mechanisms, as well as other major components of the collating machine, are driven from shaft 59 of the sheet collecting drum, said shaft being driven by a pinion 99 engaging a spur gear 101 which is fixed to shaft 59 (see Fig. 2). Pinion 99 is fixed to a stub shaft 103 journaled in side frame member 53, said stub shaft being driven by motor 91 through a belt 105. Belt 105 is trained over a pulley 107 fixed to stub shaft 103 and a pulley 109 fixed to motor shaft 89.

Releasing gate mechanism 97 (see Figs. 8, 15 and 24) includes a rock shaft 111 journaled in an auxiliary frame 113, the latter forming the connecting medium between adjustment devices 64, previously mentioned, and feed table 63 (see Fig. 28), and consequently auxiliary frame 113 is vertically adjusted relative to main frame 51 upon adjustment of adjustment devices 64.

Figure 8:
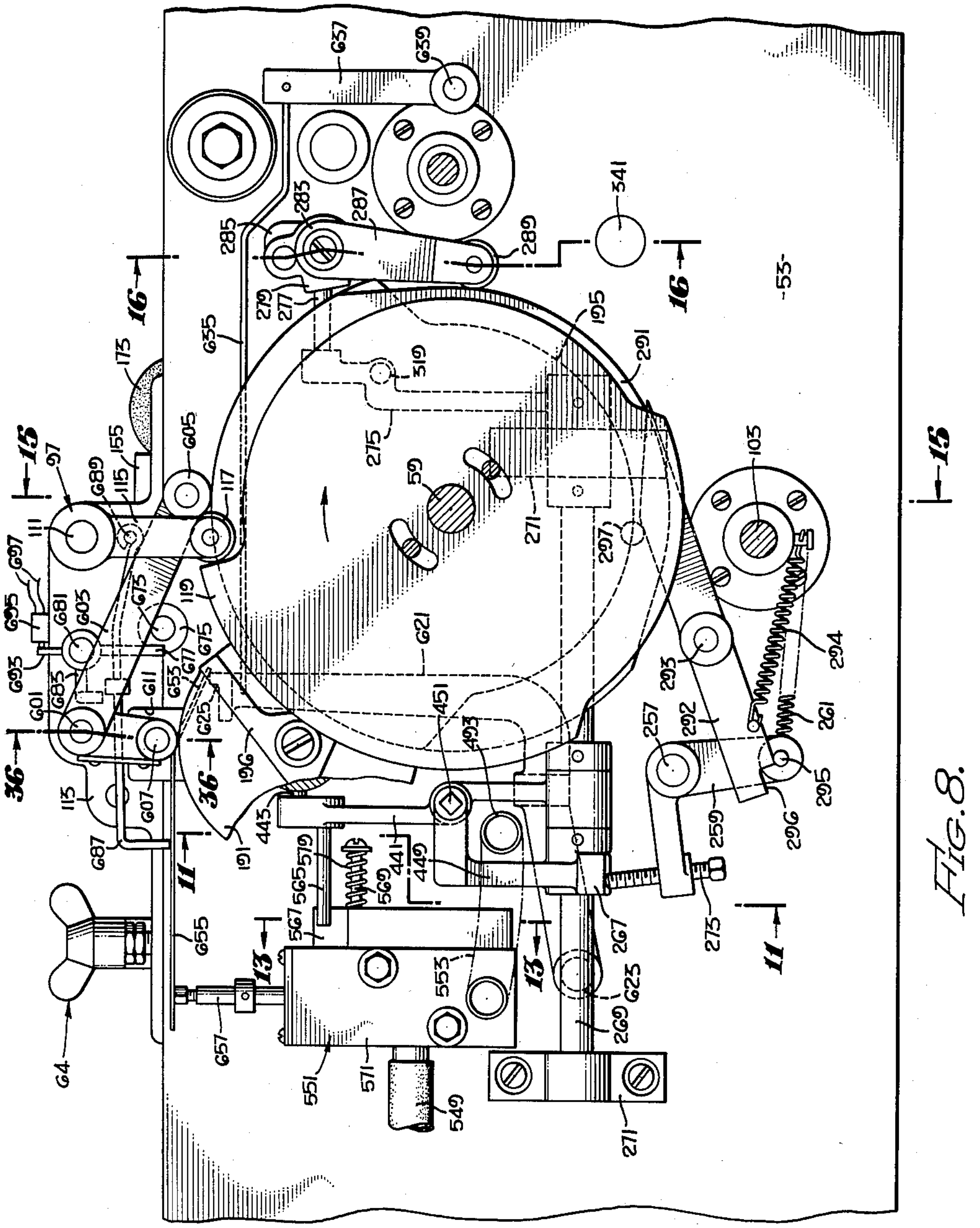
Fig. 8 is a vertical sectional view, in side elevation, taken from the gear side of the machine along line 8—8 of Fig. 1 in the direction indicated, showing operating and control means for various mechanisms of the machine.
Figures 25, 26, 27:
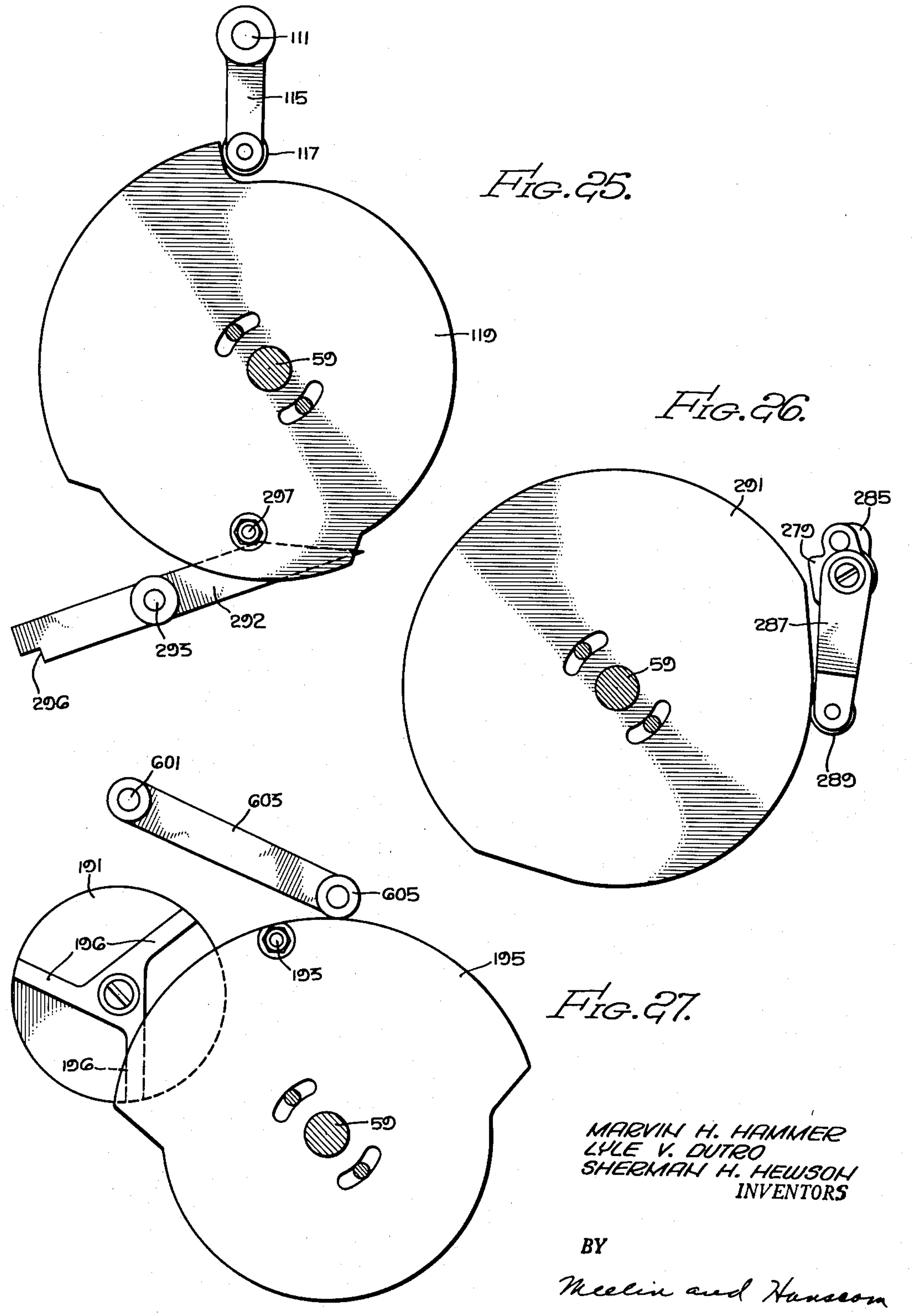
Fig. 25 is an isolated view showing the gate control cam and the immediate elements operated thereby.
Fig. 26 is an isolated view showing the control cam for the sheet stripping mechanism.
Fig. 27 is an isolated view showing the detector cam of the emergency control mechanism and the immediate elements actuated thereby.

Referring to Figs. 8, 15 and 25, it is apparent that shaft 111 has fixed to the gear side end thereof an arm 115 carrying a cam follower roller 117, the latter being disposed to be engaged by the rise on a gate control cam 119. Cam 119 is fixed to shaft 59 of the sheet collecting drum and is driven thereby.

Figure 4:
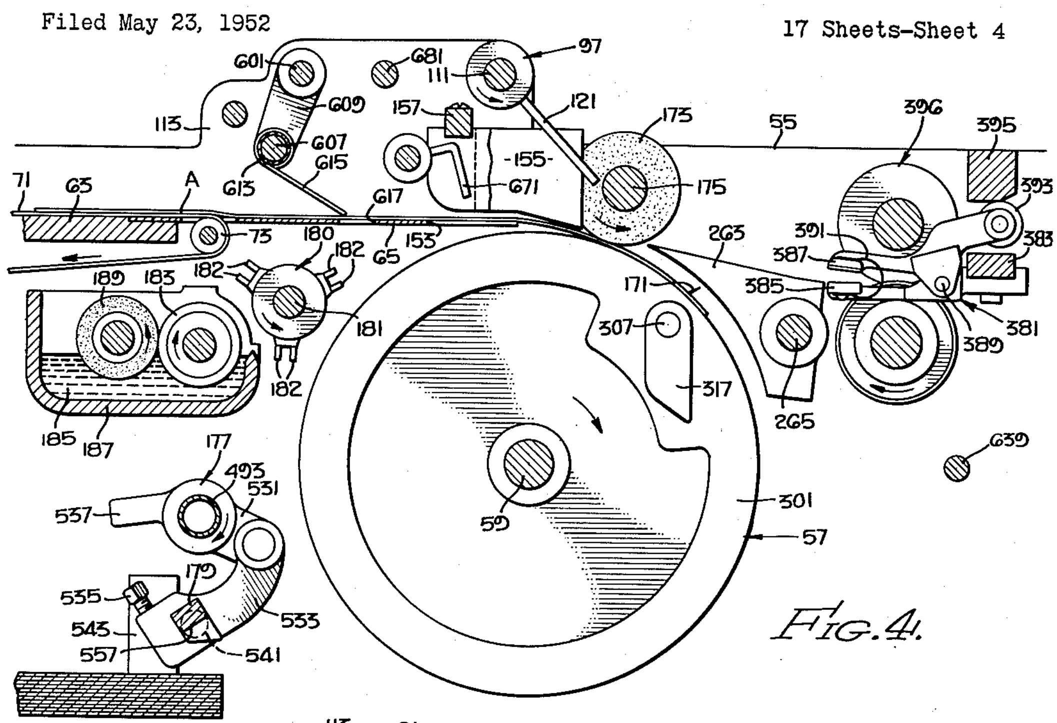
Figs. 4, 5, 6 and 7 are views similar to Fig. 3, showing successive stages of operation of the mechanisms disclosed in Fig. 3.

Rock shaft 111 carries a plurality of stop fingers 121 (compare Figs. 3 and 24), which fingers are adapted to be pivoted, upon engagement of the rise on cam 119 with roller 117, from the position shown in Fig. 3 to the position shown in Fig. 4, to release a sheet of paper for pickup by the sheet collecting drum 57. The initial sheet to be picked up by drum 57 has been designated by the letter A.

Fingers 121 are adapted to be maintained in a substantially vertical position, the position shown in Fig. 3, until shaft 111 is rocked, by a spring 123 (see Fig. 15) which urges rock shaft 111 in a clockwise direction, as the parts are shown in Fig. 3. Rock shaft 111 is limited in such clockwise movement by the engagement of an arm 125, fixed to shaft 111, with a stop pin 127 fixed to auxiliary frame 113 (compare Figs. 15 and 24). As best shown in Fig. 15, spring 123 is connected at one end to auxiliary frame 113 and at its opposite end to a pin 128 carried by an arm 129, the latter being fixed to shaft 111 and primarily forming a component part of the emergency control system, to be described hereinafter.

Timing gate mechanism 95 (see Figs. 1 and 24) includes a rock shaft 131 having depending stop fingers 133, said shaft being journaled in bearing brackets 135 secured to the underside of feed table 63. As is apparent from Fig. 29, bearing brackets 135 are mounted on a pivot shaft 136 journaled at its ends in side frame members 53 and 55 and about which the rear end of feed table 63 pivots.

Timing gate mechanism 95 is actuated by rock shaft 111, and in delayed timed relation to the operation of said rock shaft, through a drive to be now described. This drive is best shown in Figs. 1, 2, 15, 24 and 29.

Referring particularly to Fig. 24, there is secured to shaft 131 an arm 137 carrying an eye 139, the latter slidably receiving a cable rod 141. Rod 141 and arm 125, on shaft 111, are connected together by a cable 143. A spring 145 connects the rear end of cable rod 141 to the gear side frame member 53 to keep cable 143 in a reasonably taut condition. It should be pointed out that stop fingers 133 are normally maintained in a vertical position by a spring 147, which urges said fingers against a stop 149 formed in feed table 63. Spring 147 is connected at its rear end to the gear side frame member 51.

Figures 6, 7:
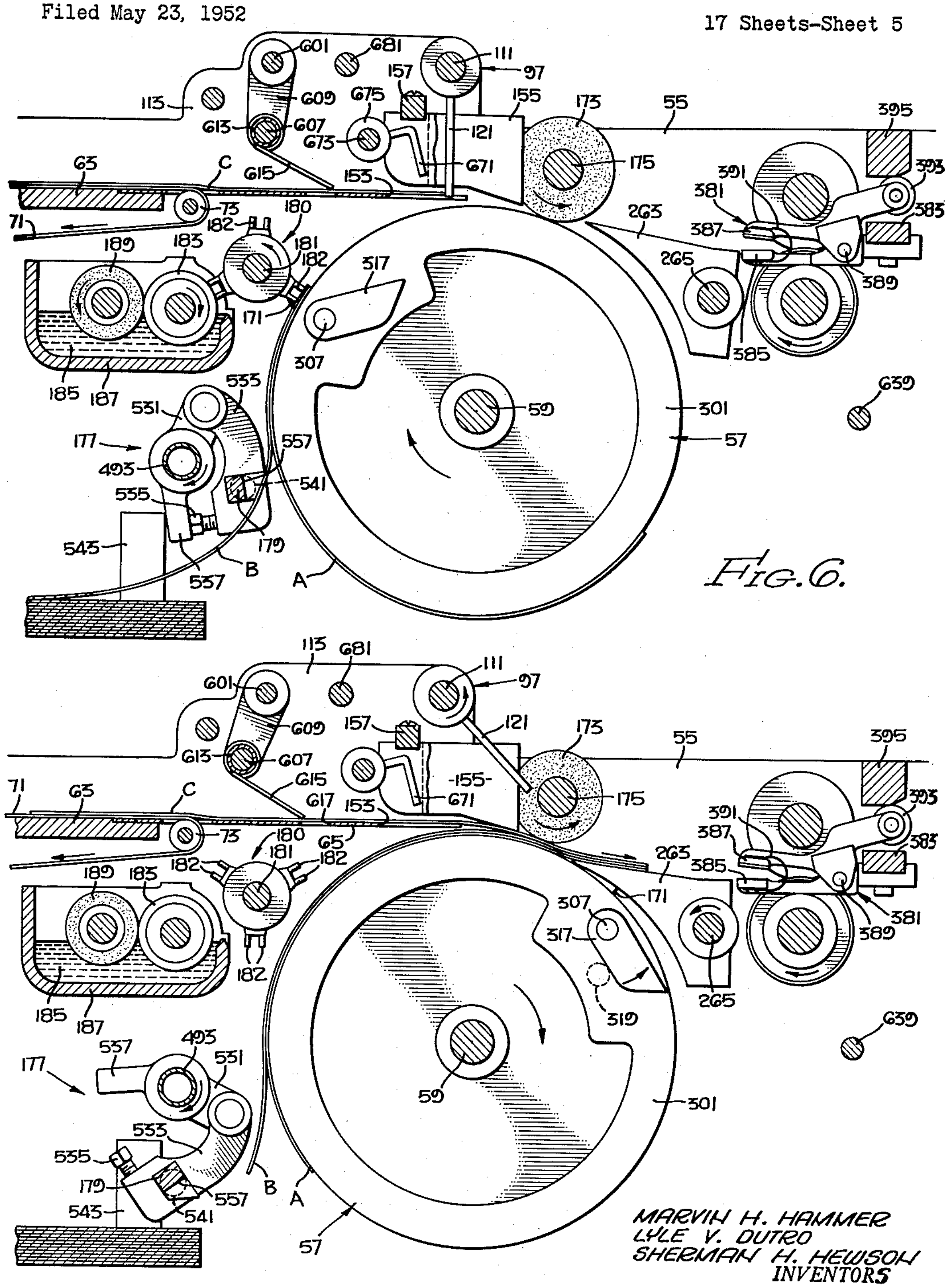

Carried by cable rod 41 adjacent the rear end thereof are check nuts 151 spaced from arm 137 when stop fingers 121 are in their vertical position. However, when rock shaft 111 is rocked, cable 143 will operate to pull cable rod 141 forwardly, and after a predetermined amount of movement of shaft 111, check nuts 151 will engage eye 139 to pivot rock shaft 131 and swing stop fingers 133 upwardly to release the paper sheet at the timing gate. Therefore, this second sheet, which has been generally indicated by the letter C in Figs. 6 and 7, is retarded from advancement toward releasing gate mechanism 97 until sheet A, at the paper sheet pickup station, has been picked up and removed by sheet collecting drum 57.

It should be stated at this time that the forward end of straddle plate 65 is slotted at 153 to accommodate stop fingers 121. Also accommodating the stop fingers are a plurality of laterally spaced sheet deflecting plates 155 (see Figs. 3, 4 and 15), which are centrally slotted to receive the fingers. The plates 155 are fixed to a crossbar 157, the latter being fixed at its ends to the sides of auxiliary frame 113. The function of such deflecting plates will be explained hereinafter.

Drum 57 rotates in a clockwise direction, as viewed in Fig. 3, and carries a single row of laterally spaced paper piercing or impaling sheet pickup pins 171, the points of which project beyond the periphery of drum 57 and are adapted to pass through slots 153 in straddle plate 65 and pick up the particular paper sheet disposed at the paper sheet pickup station, which sheet was just previously stopped by stop fingers 121 of the releasing gate mechanism. Stop fingers 121 are timed to release each paper sheet just prior to the piercing of said sheet by the pickup pins.

Pickup pins 171 are mounted, in a manner to be presently described, so as to be normally disposed in forwardly inclined positions. After a paper sheet has been impaled and as the drum rotates, plates 155 serve to progressively shove the picked up paper sheet down on the pickup pins. Forwardly of the deflector plates are a plurality of rubber rollers 173 carried on a shaft 175, the latter being journaled in side frame members 53 and 55. Rubber rollers 173 engage the periphery of drum 57 and serve (in addition to another function to be explained hereinafter) to complete the impaling of a sheet by the pickup pins so that the forward margin of the sheet is flat against the drum. Rollers 173 are arranged out of alignment with respect to the paths of travel of pickup pins 171.

As the drum continues to rotate, the pickup pins are brought around into proximity with a carbon sheet feeding means 177, which assumes the form of a pickup mechanism. It suffices to say at the present time that a vacuum sheet pickup head 179 is swung downwardly to pick up a carbon sheet and then upwardly to dispose the forward margin of such sheet in a position to be impaled by pickup pins 171.

Head 179 is controlled so that it approaches the drum a distance such that the pickup pins pierce the forward margin of a carbon sheet at points spaced more closely to the adjacent edge of the carbon sheet than in the case of a paper sheet. The forward edges of such sheets are therefore staggered with respect to one another. The construction and operation of the carbon sheet pickup mechanism will be described hereinafter.

By suitably adjusting the spacing of the forward end of straddle plate 153 relative to the periphery of drum 57, by manipulation of adjustment devices 64, the amount of stagger between a paper sheet and a carbon sheet can be regulated.

*Glue applicator mechanism*

Referring to Figs. 3, 8, 11 and 12, the glue applicator mechanism and its drive are shown and include an intermittently advanced rotary glue applicator 180, the shaft 181 of which is journaled at its ends in side frame members 53 and 55. Glue applicator 180 is disposed above the carbon sheet pickup mechanism, shown in Fig. 3, and has six rows of elastomer glue applicator elements 182 arranged in three groups of two rows each.

The end faces of such elements are adapted to be coated with an adhesive material by contact with an intermittently advanced dipping roll 183, said roll being partially immersed in a fluid bath of adhesive material 185 contained in a glue pot 187. Roll 183 is journaled at its ends in pot 187, and the pot is in turn supported by side frame members 53 and 55. A resilient idler wiping roll 189, journaled in the sides of pot 187, engages roll 183 to remove excess glue prior to contact between roll 183 and elements 182. Elements 182 are arranged out of alignment with the paths of travel of pickup pins 171.

Shaft 181 is intermittently advanced in the following manner. Referring to Figs. 8, 11, 12 and 27, there is disclosed, slidably but non-rotatably mounted on the gear side end of shaft 181 by a key 190, a star wheel 191 adapted to be intermittently rotatably advanced by a drive pin 193. Drive pin 193 is carried by a detector cam 195, which primarily forms a component part of the emergency control system, to be explained hereinafter. Cam 195 is fixed to and rotatable with shaft 59 of sheet collecting drum 57.

Star wheel 191 has three arms 196 corresponding in number to the number of pairs of rows of glue applicator elements 182, so that the rows are advanced 120 degrees upon each complete revolution of shaft 59, to bring a double row of glue applicator elements into contact with the forward staggered margins of the carbon sheet and the paper sheet on sheet collecting drum 57.

The timing is such that the forward row of glue applicator elements 182, of the pair disclosed in operative position in Fig. 6, is brought into contact with the exposed margin of paper sheet A, and the other or trailing row of glue applicator elements 182 is brought into contact with the forward margin of the carbon sheet, the carbon sheet being generally designated by the letter B. The sheets are then in condition for the reception of a second paper sheet C, which operation will be presently explained.

Figure 9:
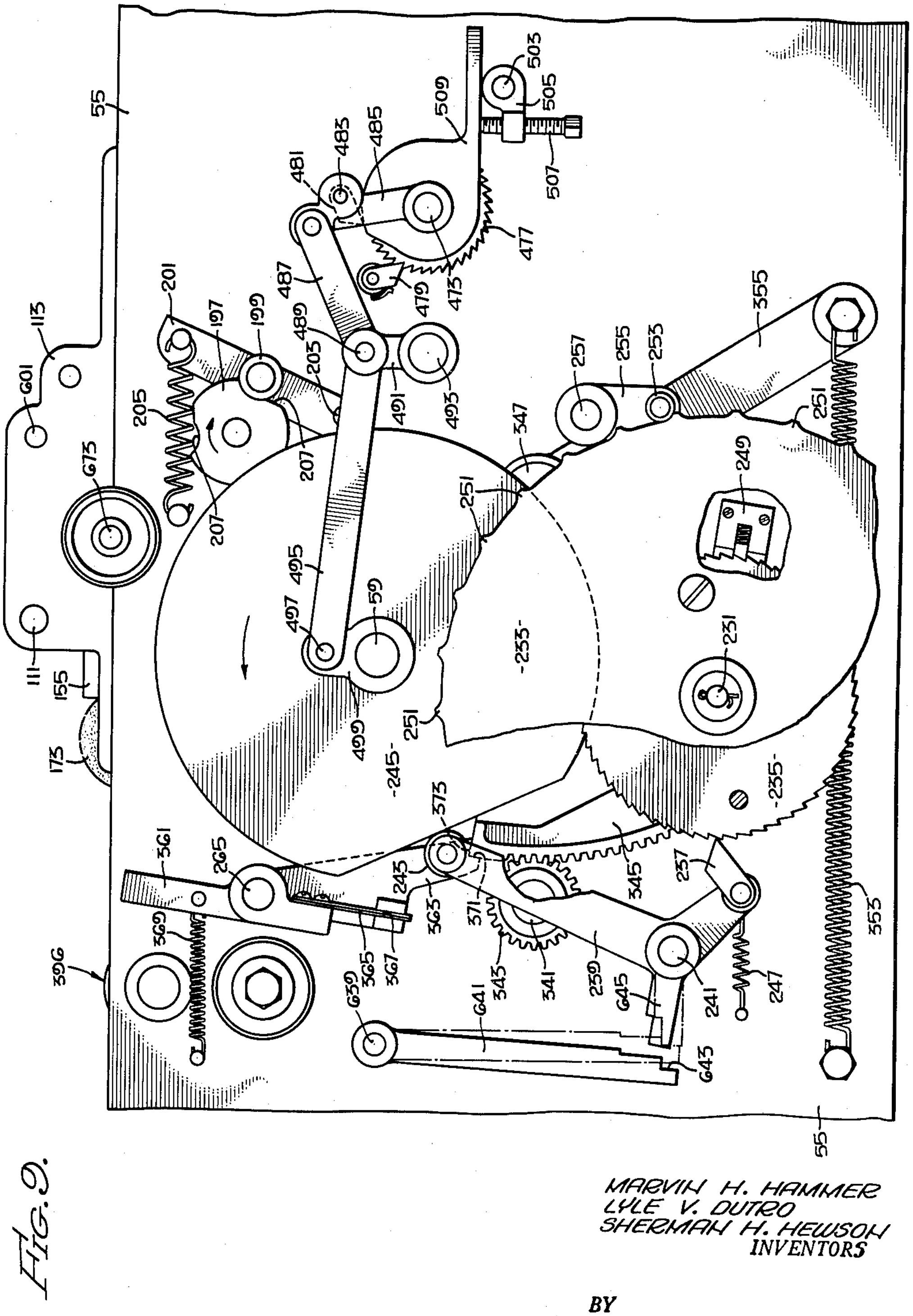
Fig. 9 is a side elevational view taken from the work side of the machine along line 9—9 of Fig. 1 in the direction indicated, showing further operating and control means for various mechanisms of the machine.

Of immediate importance is a detent mechanism, operable on shaft 181 which carries star wheel 191. Referring to Fig. 9, the work side end of shaft 181 has secured thereto a disc 197. Constantly engaging this disc is a roller type detent 199 carried by an arm 201, said arm being pivoted to side frame member 55 at 203. Arm 201 is urged to the left, as the parts are shown in Fig. 9, by a spring 205 connecting the arm to side frame member 55.

Indexing disc 197 has three recesses at 207, each recess being forwardly relieved so that once the roller detent 199 enters the forward portion thereof, the indexing disc is urged around (by spring 205) to a position where the detent is fully seated in said recess to releasably hold the disc and therefore the glue applicator in a position with the glue applicator elements thereof in the inoperative positions (the positions shown in Fig. 3) until the star wheel is once again engaged by drive pin 193.

Figure 12:
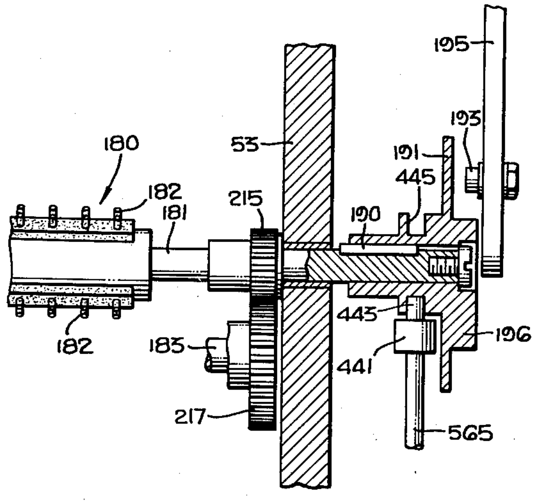
Fig. 12 is a horizontal sectional view taken along line 12—12 of Fig. 11, further showing the details of the clutch for the glue applicator.

As shown in Fig. 12, dipping roll 183 is driven from shaft 181 of the glue applicator 180 by a pinion 215 fixed to shaft 181 and engaging a spur gear 217 fixed to roll 183.

Star wheel 191 can be shifted laterally from the position shown in Fig. 12 to the left to inactivate the star wheel. Such movement will be presently explained.

To be immediately explained, however, is the picking up of paper sheet C. Referring to Figs. 4, 5, 6 and 7, it is apparent that the timing gate mechanism 95 has been operated upon the release of paper sheet A to allow paper sheet C, previously held at the timing gate, to be conveyed forwardly. Releasing gate mechanism 97 is operated so that after the trailing edge of paper sheet A passes thereby, the releasing gate is swung back to its obstructing position (compare Figs. 4 and 5) before the arrival of the leading edge of paper sheet C. Thereafter, as drum 57 rotates to pick up carbon sheet B, paper sheet C engages the releasing gate and is disposed to have its forward margin pierced upon the next pass of pins 171 through the slots in straddle plate 65.

Paper sheet C is now disposed in the same position as was paper sheet A, so that pins 171 will pierce the forward margin thereof at points spaced from the forward edge thereof the same distance as in the case of the piercing of paper sheet A. The picking up of paper sheet C is accomplished in the same manner as the picking up of paper sheet A, the releasing gate functioning to release sheet C just as the pins 177 contact the same.

Deflector plates 155 function to downwardly deflect the forward margin of sheet C to more fully impale the same, and rubber rollers 173 again function to complete the impaling operation and to press the forward margin of sheet C against the forward margins of both sheets A and B to effect a bond therewith through the medium of the adhesive material thereon.

Now, the accumulated set of sheets on collecting drum 57 can either be removed or other sheets, carbon and paper, can be added thereto. To enable the operator to select the number of sheets accumulated, a removable cycle plate is provided and will now be described in connection with some of the various parts controlled thereby.

*Regular control system*

Referring particularly to Figs. 9 and 15, it is apparent that there extends from the work side of frame 51 a fixed stub shaft 231 having rotatably mounted on the outer end thereof a cycle plate 233 and a ratchet wheel 235 movable in unison with one another. Cycle plate 233 controls what may be most conveniently termed the regular control system of the machine. For intermittently advancing the cycle plate, a pawl 237 is provided and engages the ratchet wheel. Pawl 237 is pivoted on one end of a bell crank 239 and is maintained in engagement with ratchet wheel 235 by the influence of gravity or by a suitable spring.

Bell crank 239 is pivoted to the side frame member 55 at 241 and carries on its opposite end a follower roller 243, the latter being constantly urged into engagement with a cycle plate actuating cam 245 by a tension spring 247. Cam 245 is fixed to drum shaft 59 and upon rotation of said shaft serves to oscillate bell crank 239 and cause intermittent rotary advancement of ratchet wheel 235, and therefore intermittent rotary advancement of cycle plate 233. A suitable spring-loaded detent arrangement at 249 is provided for ratchet wheel 235.

Cycle plate 233 has a plurality of circumferentially arranged equally spaced projections 251, each projection being adapted when brought into engagement with a roller 253 to set in motion the actuation of a sheet stripping mechanism for stripping the accumulated sheets from the drum, and also effect other mechanisms in a manner to be explained.

The particular cycle plate shown is designed to cause a stripping of sheets from the drum once every two revolutions of said drum, and, therefore, there will be a stripping action after three sheets, two paper sheets and an interleaved carbon sheet, have been accumulated. To this end, the spacing of projections 251 is such that two increment advancements by pawl 237 are necessary to bring a projection into contact with follower roller 253. Thus, roller 253 is actuated once every two revolutions of sheet collecting drum 57.

Other cycle plates having different spacing of the projections thereon would obviously allow a greater accumulation of sheets, it being pointed out that the accumulated sheets will always consist of one more paper sheet than carbon sheets.

Follower roller 253 is carried by an arm 255 secured to the work side end of a main control shaft 257, the latter being journaled in side frame members 53 and 55. Shaft 257 extends across frame 51 from the work side shown in Fig. 9 to the gear side shown in Figs. 8 and 11. Referring to these latter figures, the gear side end of control shaft 257 has secured thereto a bell crank 259, which is spring urged by a tension spring 261 in a counter-clockwise direction as the parts are depicted in Fig. 8. This spring action obviously urges cam follower roller 253, shown in Fig. 9, toward cycle plate 233 and normally disposes the follower roller in engagement with the cycle plate.

Bell crank 259 is adapted to actuate a plurality of stripper blades or plates 263 (see Fig. 3) through various parts to be presently described. Stripper blades 263 are concavely contoured as clearly shown in Fig. 3 and are fixed to a shaft 265 which is journaled in side frame members 53 and 55.

The driving connection between bell crank 259 and stripper shaft 265 includes a rocker arm 267 (compare Figs. 8 and 11) fixed to a rock shaft 269, said shaft being journaled in bearing brackets 271 fixed to side frame member 53. For engagement with rocker arm 267, bell crank 259 is provided with an adjustment screw 273.

The operation to this point reveals that when a projection 251 on cycle plate 233 engages follower roller 253, control shaft 257 is rocked and screw 273 causes a pivoting of rock shaft 269.

Figure 16:
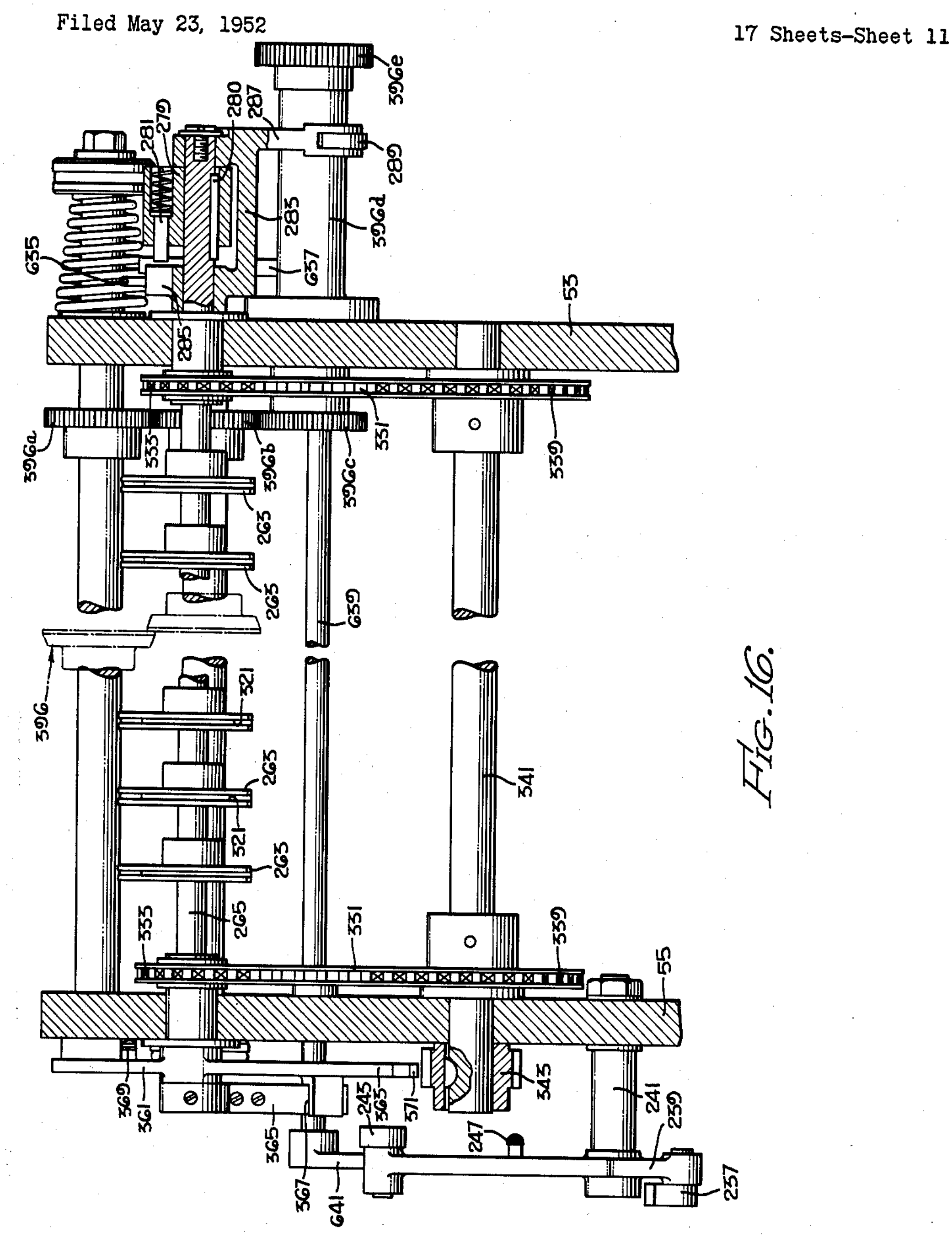
Fig. 16 is a vertical transverse sectional view through the machine looking toward the delivery end of said machine and being taken along line 16—16 of Fig. 8, showing primarily the sheet stripping and slitting mechanisms and the means for driving and controlling operation of the same.

Also fixed to rock shaft 269 is an arm 275 (see Figs. 8 and 15) carrying a pin 277 disposed in a socket (not shown) formed in a movable clutch element 279 (compare Figs. 8 and 16). Clutch element 279 is slidably but non-rotatably mounted on the gear side end of stripper shaft 265 by means of a key 280 and carries a driving pin 281 spring loaded to the left as the parts are depicted in Fig. 16. Also mounted on the gear side end of stripper shaft 265 is a second clutch element 283 rotatable relative to said stripper shaft and having an actuating lug 285 engageable with driving pin 281 only when the driving pin has been shifted from the position shown in Fig. 16 to the left and clutch element 283 (carrying the lug) rocked.

For rocking clutch element 283, said clutch element has an arm 287 formed integrally therewith carrying a cam follower roller 289 disposed in constant engagement with a stripper control cam 291 (see Figs. 8 and 26) under the influence of a spring (not shown). Cam 291 is fixed on drum shaft 59 so that operation of the stripper mechanism is in timed relation to rotation of the drum. Cam 291 serves to rock clutch element 283 upon each complete revolution of drum 57, but this will not cause a stripping operation until a projection 251 on the cycle plate has engaged roller 253 and causes, through the driving connection previously mentioned, a shifting of clutch element 279 to the left so as to dispose pin 181 thereon in the path of travel of lug 285 on clutch element 283.

It is convenient at this point to give a short summary of the operation of the mechanism described above. As shown in Fig. 3, the stripper blades 263 are in their inoperative positions and will remain in such positions until drum 57 has rotated one complete revolution. The parts disclosed in Fig. 9 are disposed to correspond to the stage of operation disclosed in Fig. 3, and the parts disclosed in Figs. 8, 15 and 16 are similarly disposed.

A cycle of operation of the machine comprises two complete revolution of drum 57, a pickup revolution and a stripping revolution. A projection 251 on cycle plate 233 is arranged to engage follower roller 253 at about the middle of each operating cycle of the machine, i. e., at the end of the pickup revolution of drum 57. As is apparent from Fig. 9, cam 245 is just about to pivot bell crank 239 and cause an advancement of cycle plate 233. Such advancement (occurring during a pickup revolution) will bring the next clockwise projection 251 just short of roller 253.

The engagement of a projection 251 on cycle plate 233 with cam follower roller 253 on control shaft 257 occurs at the beginning of the stripping revolution of drum 57 and at a time just prior to the engagement of pins 171 with sheet C, so as to condition the apparatus for stripping by causing pin 281 to be projected into the path of travel of lug 285 on clutch element 283. Lug 285 will engage pin 281 upon engagement of cam follower roller 289 (see Fig. 26) with the rise on stripper cam 291 which action will almost immediately occur. Stripper shaft 265 and the stripper blades thereon will be pivoted to their operative positions upon the engagement of the lug and pin. It is apparent that the pivoting of control shaft 257 by engagement of a projection 251 on cycle plate 233 with follower roller 253 is only momentary and it is necessary for the stripper blades 263 to remain in engagement with the drum through a portion of the rotation of said drum greater than would be caused by such momentary engagement. Holding of control shaft 257 into its pivoted position is also necessary in connection with other mechanisms to be described and, therefore, a latch means for holding control shaft 257 and therefore bell crank 259 in their pivoted operative positions for a substantial portion of one complete revolution (the stripping revolution) of drum 57 is provided.

This latch means is best shown in Fig. 8 and includes a latch lever 292 pivoted at 293 intermediate its ends on side frame member 53 and urged toward a counterclockwise latching position by a tension spring 294. Bell crank 259 carries a latch pin 295 adapted to engage a step 296 formed on latch lever 292 when the bell crank is rocked to its operative position, whereby control shaft 257 and bell crank 259 will be latched in their pivoted operative positions until the latch lever is tripped.

For tripping latch lever 292, a tripping pin 297 is provided and fixed to gate control cam 119 (compare Figs. 8 and 25). As is apparent from Fig. 8, latch lever 292 has just been tripped and will be re-set upon the completion of one full revolution (the pickup revolution) of drum 57, because at this time a projection on cycle plate 233 will engage follower roller 253 and cause bell crank 259 to pivot. Figs. 3 and 9 therefore indicate the parts in the positions assumed just after the completion of the previous operation cycle and at the beginning of a new cycle.

When latch lever 292 is tripped, cycle plate follower roller 253 snaps back against cycle plate 233 under the influence of spring 261. This movement releases rock shaft 269 for return movement to its inoperative position under the influence of spring means, to be described hereinafter, and therefore clutch elements 279 and 283 disengage. Stripper blades 263 have been previously shifted back to their inoperative positions because of roller 289 riding off the rise on cam 291.

It is pointed out that the drive through pin 193 (see Fig. 12) and the star wheel 191 for the glue applicator 180 should be disengaged during the stripping revolution of drum 57 so that the drum does not have adhesive material applied thereto. The inactivation of the glue applicator will be explained hereinafter. It suffices for the present to say that such inactivation is caused by the operation of various parts actuated by rock shaft 269, which as has been previously mentioned, is actuated in turn by control shaft 257 whose movement is controlled by cycle plate 233.

In order to easily strip accumulated sheets from drum 57, it is necessary to tilt pins 171 from forwardly inclined to rearwardly inclined positions. At this point, it is convenient to explain the construction of drum 57 and the mounting of pickup pins 171 thereon.

Referring to Figs. 15 and 20 through 23, it is apparent that drum 57 is composed of a pair of spaced flanges 301 and 303 keyed to drum shaft 59. Carried by flanges 301 and 303 is a cylindrical shell 305. Pivoted at its ends in the drum flanges is a pin supporting bar 307 removably carrying sheet pickup pins 171 by means of clamping screws 309. Pins 171 extend through openings 310 formed in shell 305.

To normally dispose pins 171 in their pickup positions, that is, their forwardly inclined positions, bar 307 has fixed to its work side end an arm 311 connected by a tension spring 313 to flange 303. Arm 311 engages a stop pin 315 on flange 303 to predetermine the forward inclination of pins 171.

When pins 171 are to be stripped, they must be rocked to their rearwardly inclined positions for ease in the removal of the sheets. To this end, bar 307 has fixed to its gear side end a tripping lever 317. Arranged to be disposed in the path of travel of lever 317 just prior to the stripping of the accumulated sheets is a bodily stationary tripping plunger 319 (see Fig. 15), which is slidably mounted in side frame member 53 and urged by a compression spring 321 to assume a retracted position.

Figure 23:
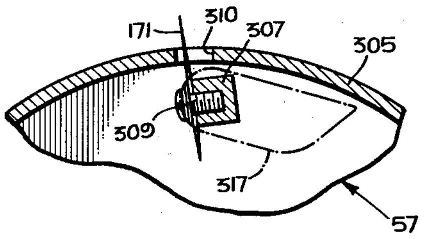
Fig. 23 is a view similar to Fig. 22 but showing the pins in position for being stripped.

When a projection 251 on cycle plate 233 causes pivoting of control shaft 257, plunger 319 is adapted to be forced into its operative position, the broken line position shown in Fig. 15, by the engagement of a boss 323 on arm 275 with an adjustment screw 325 threaded into the end of tripping plunger 319. As previously explained, control shaft 257 is pivoted at a time just prior to the engagement of pins 171 with sheet C, but pins 171 are not immediately tilted to their rearward position and will not be so tilted until lever 317 is brought around into engagement with plunger 319. This occurs at a time just after the sheet C has been impaled and before the stripper plates 263 have engaged the forward edges of the accumulated sheets. Such a rearward inclination of the pins is shown in Figs. 7 and 23.

It is pointed out that after the sheets are stripped, it is important that a carbon sheet not be picked up upon the succeeding passage of pins 171 past the carbon sheet feeding mechanism, and also that the glue applicator 180 be inactivated so as not to apply glue to the bare drum. However, the explanation of the mechanism for accomplishing the above inactivating operations will be explained after the explanation of the delivery mechanism which carries the accumulated sheets away from the drum.

*Sheet delivery mechanism*

Figure 10:
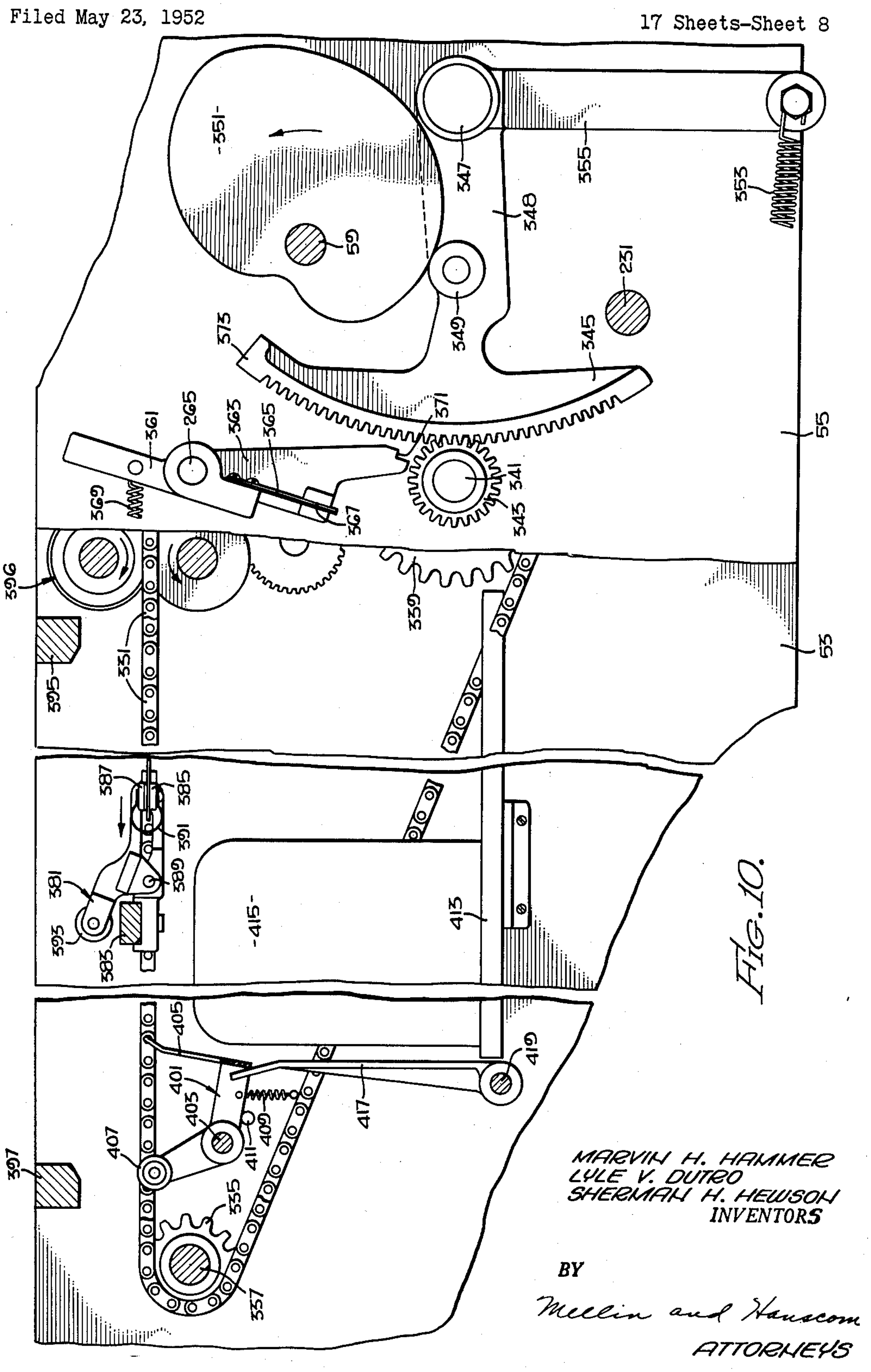
Fig. 10 is a vertical sectional view taken along line 10—10 of Fig. 1, showing the delivery mechanism.

Primarily referring to Figs. 1 and 10, there is shown a pair of laterally spaced conveying chains 331 supported at one set of ends by a pair of sprockets 333 (see Fig. 1) freely mounted on stripper shaft 265, and at the other set of ends by a pair of sprockets 335 (see Fig. 10) supported by a shaft 337, the latter being journaled in side frame members 53 and 55. Adapted to drive chains 331 are a pair of driving sprockets 339 fixed to a drive shaft 341.

Drive shaft 341 has fixed to its work side end a spur gear 343 engaging a gear segment 345, said segment being pivoted at 347 on side frame member 55. Gear segment 345 has an extension 348 carrying a follower roller 349 urged toward engagement with a delivery control cam 351 by a tension spring 353. Spring 353 is connected at one end to side frame member 55 and at its opposite end to an arm 355, which is formed integrally with or fixed to extension 348 of gear segment 345. Cam 351 is fixed to the work side end of drum shaft 59 and is therefore operable in timed relation to rotation of drum 57 and stripper blades or plates 263.

Cam 351 is constantly rotated and would, if in constant engagement with roller 349, cause reciprocation of the upper reaches of chains 331 upon each rotation of drum 57 through the medium of gear segment 345 and gear 343. However, it is desired to reciprocate chains 331 only when a set of accumulated sheets has been stripped, and therefore means are provided for locking roller 349 out of engagement with cam 351 until a stripping operation is to commence.

This means is best shown in Fig. 10, where it is apparent that the work side end of stripper shaft 265 has fixedly mounted thereon an arm 361, and freely mounted thereon a locking arm 363, said arms being drivingly connected by leaf springs 365 which are secured to arm 361 and slidably received in a slot 367 formed in arm 363. Arm 361 is urged by a tension spring 369 in a counterclockwise direction as the parts are depicted in Fig. 10.

The lower end of locking arm 367 is provided with a step at 371 for engagement with the upper corner 373 of gear segment 345. The locked position of arm 363 and gear segment 345 is shown in Fig. 9.

Chains 331 carry a plurality of laterally spaced grippers 381 which are normally disposed in position for receiving a set of accumulated sheets from drum 57, this position being shown in Fig. 3. The parts in Fig. 10 are disposed to depict a traveling of the chains. Grippers 381 are mounted on a bar 383 secured at its ends to opposed links in chains 331.

Each gripper comprises a relatively fixed lower jaw 385 and a movable upper jaw 387 pivoted at 389 to the lower jaw. Lower jaws 385 are fixed to bar 383 in positions so that their gripping surfaces are substantially coplanar with the top surfaces of the stripper blades or plates 263 when the blades are in their stripping positions (see Fig. 7). The jaws of each gripper are urged together by a hair pin spring 391.

To open grippers 381 when at their sheet receiving positions, there is provided on each upper jaw a roller 393 engageable with a cam bar 395, the latter being fixed to side frame members 53 and 55. When the grippers are moved from the position shown in Fig. 10 to the position shown in Fig. 7, rollers 393 engage the cam bar to open the grippers for reception of the forward margins of a stripped set of accumulated sheets.

When stripper shaft 265 is rocked to dispose stripper blades 263 in stripping positions, shaft 265 through arms 361 and 363 causes a release of gear segment 245 (see Fig. 10), because of the pivoting of arm 363, whereby just as the forward margins of the stripped set of sheets are entering the open grippers, cam 351 causes chains 331 to travel to the right or forwardly as the parts are depicted in Fig. 7, so that the rollers 393 clear cam bar 395 and consequently the grippers close and grip the forward margins of the stripped accumulated sheets.

Preferably, there is provided a slitting mechanism for slitting each set of sheets into a plurality of portions, it being contemplated that a plurality of business forms, invoices, sales slips, etc., will be printed on each sheet and separated by the slitting operation. This slitting mechanism is substantially conventional in construction and is generally entitled 396 in Figs. 1, 2 and 16. The number of pairs of slitting discs will be such that each set of sheets is divided into a plurality of portions, each portion being held by at least one gripper. The slitting mechanism is driven by a gear train (see Figs. 2 and 16) including gears **396*a*, 396*b*, a gear 396*c* mounted on a stub shaft 396*d*, and a gear 396*e* mounted on said shaft and engaging large gear 101 mounted on drum shaft 59**.

Grippers 381 during their travel will draw the paper sheets through the slitting mechanism to effect a division of a set of accumulated sheets.

As the grippers reach their forwardmost points of travel, rollers 393 engage a second cam bar 397 to open the grippers for release of the divided set of sheets. To ensure removal of the portions from the grippers, a kickout member 401 is provided for positively kicking the portions out of the open jaws of the grippers.

Referring to Fig. 10, kickout member 401 is fixed to a shaft 403, which is journaled in side frame members 53 and 55. Kickout member 401 is generally bell crank shaped as shown in Fig. 10 and has a plurality of kickoff fingers 405 formed on one end and carries on its opposite end a single roller 407. There is at least one finger for each gripper. Roller 407 is disposed to be engaged by gripper supporting bar 383 simultaneously with or just prior to the engagement between cam bar 397 and gripper rollers 393. Upon engagement of bar 383 with roller 407, fingers 405 are projected upwardly to engage the forward margins of the sheet portions and kick the same out of the open grippers. Kickout member 401 is urged by a spring 409 against a stop 411, which spring serves to return the fingers to their inactive positions after a kickout operation.

Disposed beneath the line cf travel of grippers 381 is a delivery magazine assuming the form of a tray 413 which is fixed to side frame members 53 and 55. Tray 413 has high sides 415 and a forward fence 417 pivoted to the tray at 419. The upper end of fence 417 is inclined to be disposed on the lefthand side of fingers 405 as the parts are shown in Fig. 10. Fence 417 is spring urged against fingers 405 by spring means (not shown) and therefore when the fingers move upwardly the fence rocks forwardly to tap the sheets on tray 413 and align the same with one another.

The description to this point has covered the entire machine, except for the emergency control system, and the details of the carbon sheet pickup mechanism and the glue applicator inactivating means. These matters will now be explained, beginning with the glue applicator inactivating means, which is a part of the regular control system of the machine and hence controlled by cycle plate 233.

*Glue applicator inactivating means*

Figure 11:
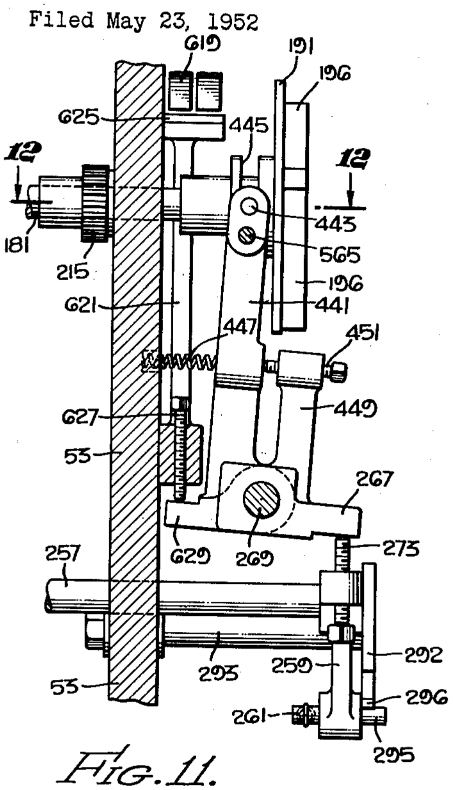
Fig. 11 is a vertical sectional view taken along line 11—11 of Fig. 8 in the direction indicated, showing primarily the clutch for the glue applicator and part of the mechanism for operating the clutch.

Referring to Figs. 8, 11 and 12, there is shown an arm 441 freely mounted on rock shaft 269 and having a pin 443 extending therefrom and disposed in a groove 445 formed in the hub of star wheel 191. Arm 441 is urged by a compression spring 447 in a clockwise direction as the parts are depicted in Fig. 11, to normally dispose the star wheel in its operative position in the path of travel of pin 193 which drives the star wheel.

Fixed to or forming an integral part of rocker arm 267 is an actuating arm 449 engaging arm 441 through the medium of an adjustment screw 451 threaded through arm 449. Upon pivoting of control shaft 257, rock shaft 269 and arm 449 are rocked to cause a shifting of star wheel 191 along shaft 181 from the full line position shown in Fig. 12 to the left to an inoperative position. Since latch lever 292 serves to latch rock shaft 269 in its operative position, the star wheel will remain inactivated until latch lever 292 is tripped. Disc 197 and detent 199 (see Fig. 9) function to hold the glue applicator 180 in its inoperative position, the position shown in Fig. 3, when the star wheel is inactivated.

It is apparent therefore that after an accumulated set of sheets has been stripped from the drum, no glue will be applied to the drum during the completion of the stripping revolution thereof. Upon completion of such revolution, latch lever 292 is tripped and the star wheel will again be shifted to its operative position (under the influence of spring 447) so that upon the next complete revolution of drum 57 (a pickup revolution), glue will be applied to the forward margins of the carbon sheet and paper sheet picked up by the drum.

The carbon sheet feeding mechanism also has to be inactivated during the stripping cycle of the drum, but since its construction has not as yet been detailed, the present is a convenient time for such explanation along with the structure for effecting its inactivation at the proper time.

*Carbon sheet pickup type feeding mechanism*

Referring primarily to Figs. 3, 9, 17, 18 and 19 and particularly Fig. 3, it is apparent that a stack of carbon sheets are supported by an elevator generally entitled 461, said elevator including a table 463 upon which the stack of carbon sheets directly rests. Table 463 is guided for vertical movement by stationary guides 465 slidably fitting within slots 467 formed in the sides of the table. Guides 465 are secured to side frame members 53 and 55.

For elevating table 463, said table is connected to a pair of elevating chains 469 which are trained over sprockets 471, the latter being fixed to a sprocket shaft 473 journaled in side frame members 53 and 55. The free ends of chains 469 are connected to tension springs 475 which in turn are connected to frame 51. These springs at least partially counterbalance the weight of the table.

Sprocket shaft 473 has fixed to its work side end a ratchet wheel 477 (see Fig. 9), said wheel being adapted to be held against movement tending to lower the table by a spring loaded locking pawl 479.

For rotating sprocket shaft 473 in a direction to elevate table 463, there is provided a driving pawl 481, pivoted at 483 to and intermediate the ends of an arm 485. Arm 485 is pivoted at one end on shaft 473 and at its opposite end to one end of a link 487. The other end of link 487 is pivoted at 489 to an arm 491, said arm being fixed to the work side end of a vacuum supply tube 493 to oscillate said tube, of which more will be presently said. Also connected to pivot 489 is one end of a connecting rod 495, the other end of which is pivotally connected at 497 to a crank 499, the latter being fixed to drum shaft 59.

From the above description, it is apparent that upon rotation of drum 57, driving pawl 481 will be reciprocated, and would, if in engagement with the ratchet wheel, cause the same to be intermittently advanced to raise table 463, and would continue to raise the table were it not for other mechanisms to be now described.

To control the height of the top of the carbon sheet stack within reasonable limits to enable successful picking up of carbon sheets therefrom, a height control finger 501 is provided and fixed to a shaft 503 which rotatably extends through side frame member 55 (compare Figs. 3 and 9). On its outer end, finger shaft 503 fixedly carries an arm 505 which in turn carries an adjustment screw 507. Screw 507 engages a guard 509, said guard being pivoted on shaft 473 and having an arcuate surface partially covering the periphery of ratchet wheel 477.

Figure 17:
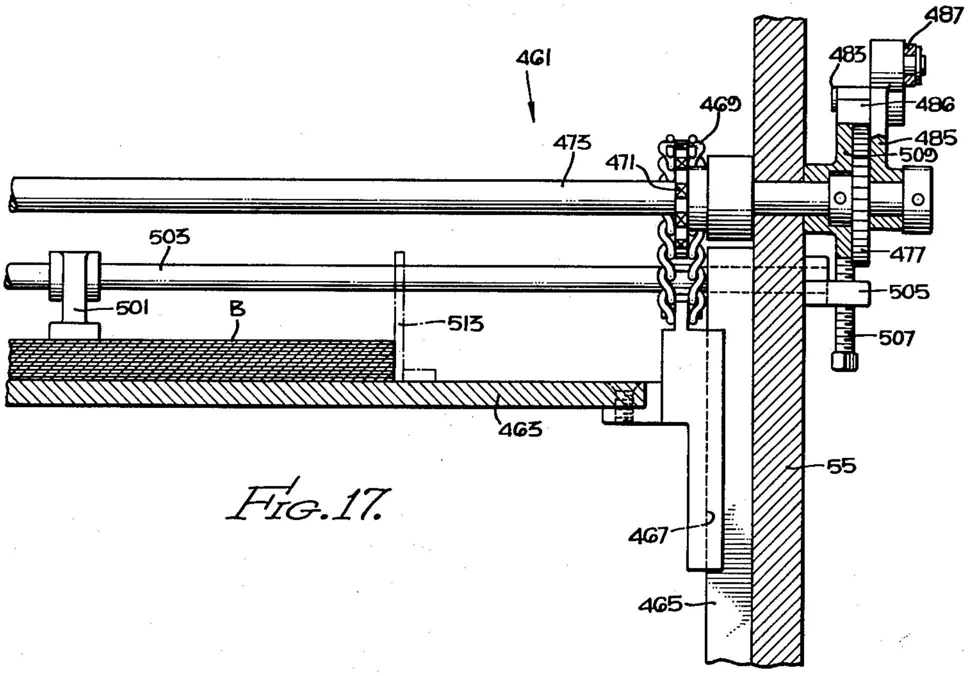
Fig. 17 is a fragmentary vertical transverse sectional view taken along line 17—17 of Fig. 3, showing part of the carbon sheet pickup mechanism.
Figure 18:
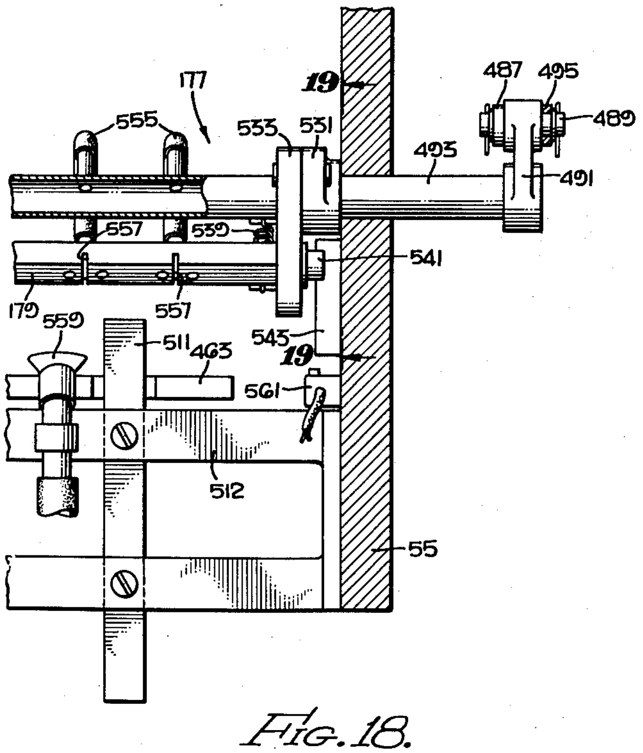
Fig. 18 is a fragmentary vertical transverse sectional view taken along line 18—18 of Fig. 3, showing further details of the carbon sheet pickup mechanism.
Figure 19:
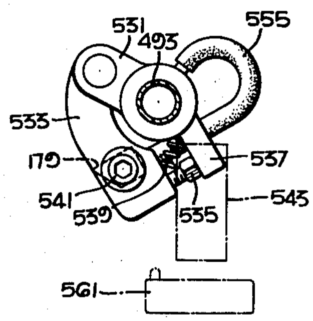
Fig. 19 is an isolated vertical sectional view taken along line 19—19 of Fig. 18.
Figure 20:
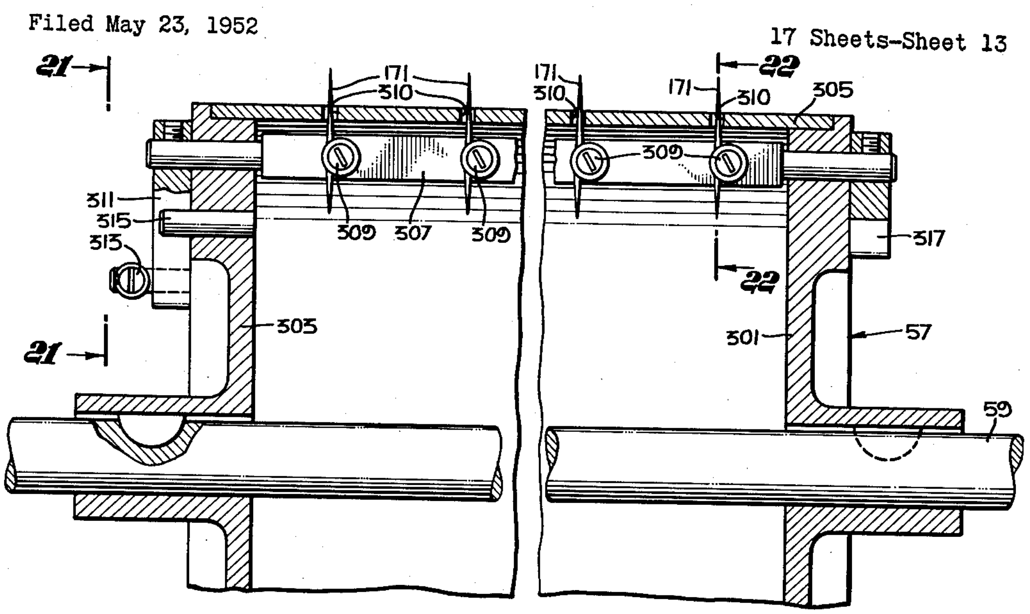
Fig. 20 is a fragmentary sectional view through the sheet collecting drum taken along line 20—20 of Fig. 3.
Figure 22:
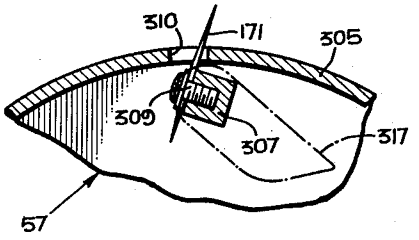
Fig. 22 is a fragmentary vertical sectional view of the sheet collecting drum taken along line 22—22 of Fig. 20, showing the manner of mounting the sheet pickup pins.
Figure 21:
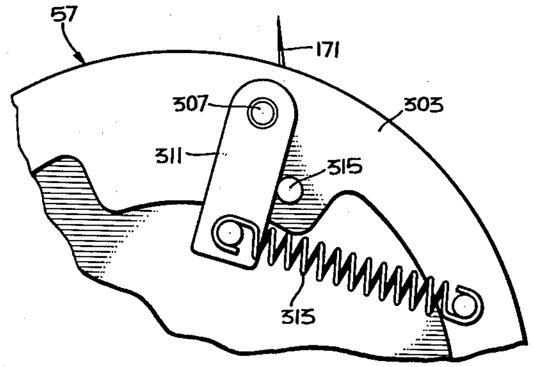
Fig. 21 is a fragmentary view in side elevation of the sheet collecting drum, taken in the direction indicated by the arrows 21—21 of Fig. 20.

Referring to Figs. 3, 9 and 17, it can be seen that guard 509 will lift pawl 481 out of engagement with ratchet wheel 477 (and has done so in Fig. 9) upon the elevation of the top of the carbon sheet stack above a predetermined level. As the carbon sheets are picked up, the guard gradually retreats from pawl 481, as finger 501 descends, and eventually allows a re-engagement of pawl 481 and the ratchet wheel. Therefore, the top of the stack will be maintained within reasonable limits at a predetermined level.

Guard 509 can be manually rotated, counterclockwise as the parts are shown in Fig. 9, to lift locking pawl 479 out of engagement with ratchet wheel 477 to enable the table to be lowered to receive a new stack of sheets.

A fence 511 is provided at the forward end of table 463 and is fixed to a cross member 512 which is in turn fixed to frame 51. A stack of sheets is adapted to be abutted against fence 511 and to be disposed in a predetermined position relative to the carbon sheet pickup head 179, previously generally referred to.

Disposed at the sides of the stack of carbon sheets and mounted on table 463 is a pair of side guides 513, which are mounted for lateral adjustment to accommodate carbon sheets of different sizes. This adjustable mounting arrangement is best shown in Fig. 3 and comprises for each guide a screw 515 threaded into the bottom of said guide and slidably extending through a T-shaped member 517, which is slidably received within a slot 519 formed in table 463. Surrounding screws 515 are compression springs 521 functioning to hold the T-plates in frictional engagement with the underside of table 463 and, therefore, in their adjusted positions. Guides 513 can be laterally adjusted by manually moving the same laterally, against the resistance of the frictional force between members 517 and table 463.

Referring to Figs. 3, 9, 18 and 19, there is shown the details of the carbon sheet pickup head 179 and also the various parts associated therewith. Vacuum supply tube or shaft 493, previously mentioned, has a pair of ears 531 thereon pivotally supporting arms 533, said arms being fixed to and carrying pickup head 179. Arms 533 have adjustable stop screws 535 threaded therein and urged into engagement with stop lugs 537 by tension springs 539. Lugs 537 are fixed to vacuum supply tube 493.

It is apparent from the description of the mechanism for raising table 463, that vacuum supply tube 493 is oscillated by actuation of connecting rod 495 (see Fig. 9) and, therefore, causes head 179 to approach the top of the carbon stack sheet upon clockwise movement of vacuum supply tube 493 as the parts are depicted in Fig. 3.

Arms 533 carry guide pins 541 which are adapted after a predetermined amount of rotary movement of tube 493, and therefore arms 533, to engage guide plates 543 secured to side frame members 53 and 55. It follows then that pickup head 179 is forced directly downwardly (by the engagement of pins 541 and plates 543) upon further rotation of vacuum supply tube 493 to cause engagement of vacuum supply head 179 and the forward margin of the topmost carbon sheet. The parts are so designed that head 179 is moved downwardly into contact with the top carbon sheet during the time pickup pins 171 are traveling from the paper sheet pickup station to the stripper blades 263.

Figure 14:
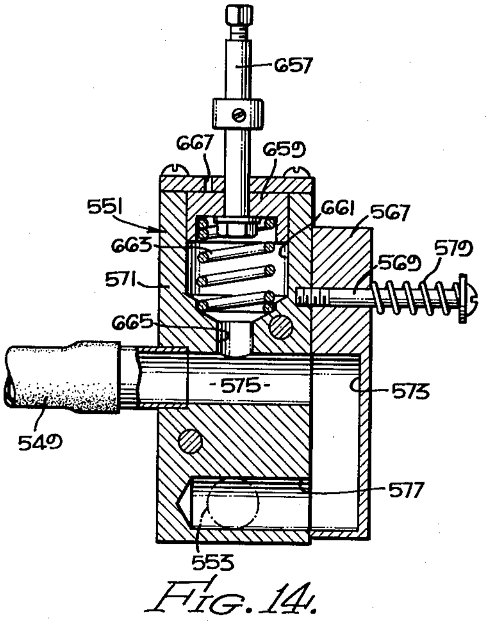
Fig. 14 is a vertical sectional view taken along line 14—14 of Fig. 13, showing the relationship of the bleeder valve to the detector piston.

To supply vacuum to pickup head 179, a vacuum pump 545 is provided and mounted on frame 51 (see Fig. 2). The vacuum pump is driven by motor 91 through a belt 547. A vacuum supply conduit 549 leads from pump 545 to a bleeder valve 551 (compare Figs. 2 and 14). Leading from valve 551 is a vacuum supply conduit 553 connected to the gear side end of tube 493. Vacuum supply conduits 555 (see Fig. 18) connect tube 493 with pickup head 179.

The bleeder valve is normally inoperative so that a vacuum is constantly supplied to head 179, although the conduits 553 do not normally contain a high vacuum because head 179 is open to the atmosphere (except of course when a carbon sheet is against the head).

Pickup head 179 is adapted to pick up the topmost sheet upon engagement therewith and upon reverse rotation of tube 493 lifts the carbon sheet into a position to be impaled by pins 171 on drum 57. Head 179 has pin clearance slots 557 formed therein to allow pins 171 to pass therethrough and drag the carbon sheet off of the head and onto drum 57.

Preferably, a blast of air from air blast nozzles 559 is provided and directed against the topmost carbon sheets to separate the picked up sheet and the next lower sheet. A microswitch 561 (see Fig. 19) is actuated by pin 541 and serves to operate a solenoid valve (not shown) to open nozzles 559 at the appropriate time, i. e., just as head 179 is picking up the top carbon sheet on the stack.

The above specific description serves as a convenient background for explaining the mechanism for inactivating head 179 to render the same incapable of picking up a carbon sheet during the stripping cycle of drum 57. This mechanism forms a part of the regular control system of the machine.

Figure 13:
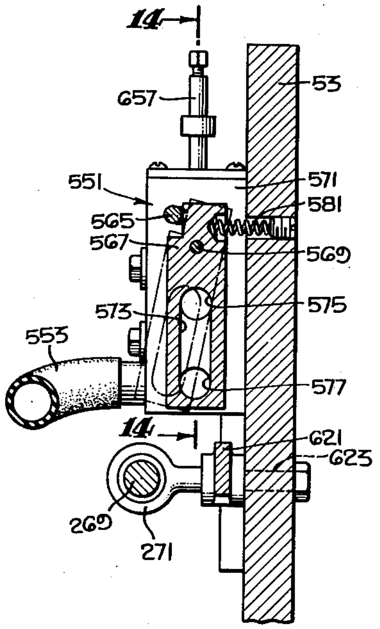
Fig. 13 is a vertical sectional view taken along line 13—13 of Fig. 8, showing the bleeder valve for the carbon sheet pickup mechanism.

Referring to Figs. 8, 11 and 13, arm 441, previously mentioned, carries a pin 565 arranged to engage a movable valve member 567 upon actuation of arm 441. As previously explained, arm 441 is actuated upon engagement of a cycle plate projection 251 with the cycle plate cam follower roller 253 (see Fig. 9). Movable valve member 567 forms a part of bleeder valve 551 and is pivoted at its upper end by a fixed pivot screw 569 on a fixed valve body 571. Movable valve member 567 has a recess 573 therein normally communicating passages 575 and 577 formed in valve body 571 with one another. Conduit 553, previously mentioned, communicates with passage 575, and vacuum supply conduit 549 from vacuum pump 545 is in communication with passage 577.

Movable valve member 567 is urged against valve body 571 by a compression spring 579 surrounding pivot screw 569. Movable valve member 567 is normally disposed in an upright position by a spring 581 (see Fig. 13) which forces the movable valve member against the retracted pin 565.

When control shaft 257 is rocked, pin 565 is advanced from the full line position shown in Fig. 13 to the dotted line position to tilt movable valve member 567 and open passage 577 to the atmosphere (see the broken line position shown in Fig. 13) to bleed the vacuum to the atmosphere and, therefore, prevent pickup of a carbon sheet by head 179. Latch lever 292 functions indirectly to hold valve member 567 in such position during the stripping revolution of drum 57, said latch lever subsequently being tripped to allow movable valve member 567 to be pivoted back to its full line position under the influence of compression spring 581.

*Summary of operation*

Presently, an emergency control system for controlling the machine under unusual conditions will be explained, such system being operable upon improper feeding of either a carbon sheet or a paper sheet to temporarily inactivate certain mechanisms of the machine. Of immediate importance, however, is a summary of the operation of the machine working under normal conditions. As previously mentioned, the particular cycle plate shown is designed for a two revolution overall cycle of the sheet collecting drum, this overall cycle comprising a pickup revolution and a stripping revolution of the drum. It is apparent that other cycle plates arranged to have an overall three revolution cycle or four revolution cycle, etc., can be provided by merely removing cycle plate 233 and replacing it with a suitable cycle plate so designed. In each case, regardless of the number of revolutions comprising the cycle, the stripping revolution will comprise the last revolution of the cycle and the remaining revolutions, whether it is one or more, will be pickup revolutions of the drum.

As was previously indicated, each paper sheet stopped on straddle plate 65 is disposed so that the forward margin thereof is impaled at a distance from the forward edge thereof greater than the distance in the case of a carbon sheet, so that the paper and carbon sheets are staggered with relation to one another on the drum.

Referring to Fig. 3, it is apparent that the pins 171 are disposed in their forward positions and are about to impale the forward margin of sheet A disposed on straddle plate 65, that is, disposed at the paper sheet pickup station. It is also apparent, by reference to Fig. 8, that stop fingers 121 for the releasing gate are about to be swung to their inoperative positions because of the engagement of follower roller 117 with the rise on the gate control cam 119. It is also apparent from Fig. 8 that a stripping revolution of drum 57 has just been completed and that the latch lever 292 has just been tripped by the tripping pin 297.

Pins 171 will pick up paper sheet A which will be forced against the surface of drum 57 by the deflector blades or plates 155 and rubber rollers 173. Referring to Fig. 9, at this particular time control shaft 257 will be in its inoperative position with follower roller 253 against cycle plate 233 and between two protuberances 251 thereon. Cycle plate 233 is intermittently rotatably advanced as the parts are depicted in Fig. 9 in a clockwise direction and it can be seen that the drum upon one complete revolution will bring the next counterclockwise projection on the cycle plate adjacent to roller 253 so that at the beginning of the second revolution of drum 57, the stripping revolution, the follower roller will be engaged by the counterclockwise disposed protuberance to pivot control shaft 257.

Figure 5:
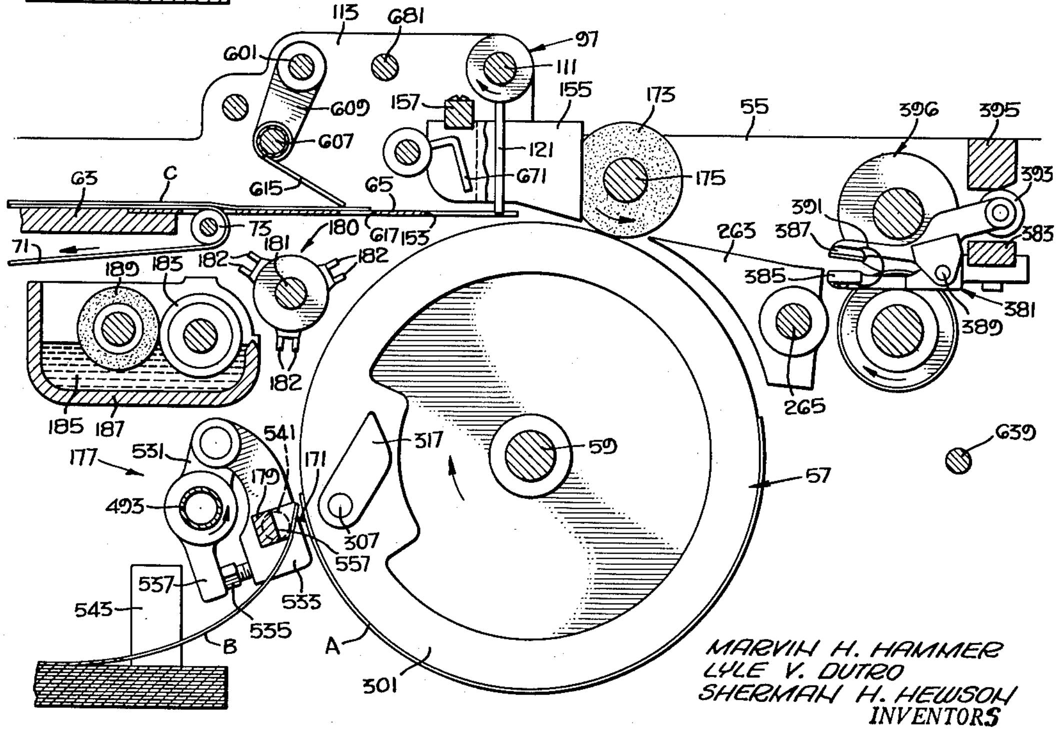

However, returning to operation of drum 57 and pickup pins 171, said pins are carried around from the position shown in Fig. 4 to the position shown in Fig. 5, where carbon sheet B is in the process of being picked up, it being apparent that the forward edges of carbon sheet B and paper sheet A will be staggered. Pin 193 on the detector cam 195 (see Fig. 27) now engages star wheel 191 to rotatably advance the glue applicator 180 so as to enable the same to apply glue substantially simultaneously to the forward margins of sheets A and B (see Fig. 6).

Just after drum 57 has rotated beyond the position shown in Fig. 6, the next counterclockwise protuberance 251 on cycle plate 233 will engage follower roller 253 and pivot control shaft 257 to condition the machine for a stripping operation. This pivoting of control shaft 257 will cause a pivoting of rock shaft 269 (see Fig. 8) to allow latch lever 292 to be latched by latch pin 295 on bell crank 259. Tripping pin 297 (on cam 119) at this time is just clockwise beyond the position shown in Fig. 8 to allow a latching of the latch lever.

Upon pivoting of control shaft 257, clutch element 279 (see Fig. 16) is shifted by the actuation of arm 275 (see Fig. 8) to interpose driving pin 281 (see Fig. 16) in the path of travel of lug 285 on clutch element 283. By reference to Fig. 15 it is apparent that arm 275 also interposes plunger 319 in the path of arm 317.

Paper sheet C is now released and picked up by pickup pins 171. Rubber rollers 173 will cause an initial bonding of the forward margin of paper sheet C to the forward margins of paper sheet A and carbon sheet B just previous to the stripping operation, said rollers pressing the forward margin of paper sheet C against the adhesively spotted forward margins of paper sheet A and carbon sheet B.

Substantially simultaneously with the pickup of paper sheet C, the rise on cam 291 engages follower roller 289 (see Fig. 26) to pivot clutch element 283 and cause lug 285 to engage pin 281 to pivot stripping blades 263 from the position shown in Fig. 6 to the position shown in Fig. 7. Just before pickup pins 171 reach the stripper blades 263, arm 317 engages plunger 319 to tilt the pins rearwardly to allow them to be readily stripped of the accumulated sheets by the said stripper blades.

As drum 57 rotates from the position shown in Fig. 6 to the position shown in Fig. 7, stripper blades 263 strip the accumulated sheets from said drum. As shown in Fig. 7, grippers 381 are disposed in position for the reception of the stripped accumulated sheets, and upon advancing movement of the upper reaches of chains 331, the grippers close on the accumulated sheets and carry the sheets through the slitting mechanism, the sheets being subsequently released by kick-out member 401.

Now to be considered are the events occurring during the remainder of the stripping revolution of drum 57. Also affected by the pivoting of stripping control shaft 257 to its operative position, is the drive to the glue applicator. As is apparent by a comparison of Fig. 8 and Fig. 11, arm 441 upon pivoting of rock shaft 269 will shift star wheel 191 inwardly to its inoperative position. Since latch lever 292 functions to latch bell crank 259 and, therefore, rock shaft 269 in their operative positions, the star wheel will remain in its inoperative position until the latch lever is tripped, which occurs at the end of the stripping revolution of drum 57.

Also affected by pivoting of arm 441 is bleeder valve 551, the movable valve member 567 thereof being swung from the full line position shown in Fig. 13 to the dot-dash line position to open the passage 577 to the atmosphere and therefore inactivate the carbon sheet pickup mechanism by rendering the pickup head 179 incapable of picking up a carbon sheet.

This latched condition will continue as the drum rotates past the carbon sheet feeding mechanism and the glue applicator, and then as the latch lever tripping pin 297 is brought around it will trip the latch lever just after pins 171 have passed by the glue applicator 180 to condition the machine for a new cycle of operation of drum 57. Fig. 8 indicates the various parts in the positions they assume just after the tripping of latch lever 292 has taken place and just prior to the beginning of a new cycle of operation.

*Emergency control system*

There is provided an emergency control detector system operable upon the failure of a paper sheet to arrive at the releasing gate (the paper sheet pickup station) or the failure of the pickup head 179 to pick up a carbon sheet to temporarily inactivate certain mechanisms of the machine until proper operation is possible, and then reactivate such mechanisms for continued proper operation of the machine. More particularly, it is the function of this control mechanism to delay the picking up of a carbon sheet if a paper sheet does not arrive at the paper sheet pickup station, until such time that a paper sheet arrives and is picked up. Conversely, if a carbon sheet is not picked up, it is the function of this control mechanism to delay the picking up of a paper sheet, until such time as a carbon sheet is picked up. That part of the emergency control system which operates upon the failure of a paper sheet to arrive at the paper sheet pickup station will now be explained.

Referring to Figs. 1, 3, 8, 11 and 36, there is shown a main detector shaft 601 journaled in auxiliary frame 113. Secured to the gear side end of shaft 601 is an arm 603 carrying a follower roller 605, the latter being disposed to engage detector cam 195, previously mentioned in connection with the operation of the drive to the glue applicator mechanism, which cam is fixed to and driven by drum shaft 59. Cam 195 serves to oscillate shaft 601.

Supported from main control shaft 601 is a second shaft 607, there being a pair of arms 609 fixedly connecting the shafts to one another. Shaft 607 extends through a clearance hole 611 formed in the gear side of auxiliary frame 113 and has rotatably mounted thereon a first sleeve 613, see Fig. 36. Sleeve 613 has a detector finger 615 fixed thereto, compare Figs. 1 and 36, which finger is disposed over an opening 617 formed in straddle plate 65.

An actuating finger 619 is also fixed to first sleeve 613, but is located outside of auxiliary frame 113. Upon oscillation of shaft 601, the lower end of finger 619 is adapted to be oscillated back and forth at a level determined by the level assumed by the lower end of finger 615, the paper sheet engaging finger. Since sleeve 613 is rotatable on shaft 607, finger 615 will be maintained in engagement with the top surface of a paper sheet during oscillation of shaft 601. However, if no paper sheet is located under finger 615, said finger will drop into hole 617 in straddle plate 65 so that the level of travel of the lower end of finger 619 will drop.

Referring to Fig. 8, the lower end of finger 619 normally moves back and forth above the upper end of a control arm 621, which is pivoted at 623 to side frame member 53. However, if finger 615 drops into hole 617, the lower end of finger 619 will drop down to a position to engage a step 625 formed on the upper end of arm 621. If the dropping of finger 615 is due to the gap between two paper sheets, the second sheet will raise finger 615 and therefore finger 619 to clear step 625 to a sufficient forward movement of finger 619 for engagement with the step. On the other hand, if no second sheet is forthcoming, fingers 615 and 619 will remain at their lower levels of movement, finger 619 engaging step 625 on control arm 621 to rock the same.

Referring to Fig. 11, control arm 621 carries an adjustment screw 627 arranged to engage a lateral lug 629 formed on arm 441, previously mentioned. When lever 441 is rocked, star wheel 191 is moved to its inoperative position and bleeder valve 551 is actuated to bleed off vacuum from the vacuum line, therefore rendering the carbon sheet feeding mechanism incapable of picking up a sheet and stopping rotation of the glue applicator 180 to prevent the application of glue to the drum or any sheet thereon. It is pointed out that the stripping blades are not affected by operation of the emergency control system because the system acts on lever 441 which is freely mounted on rock shaft 269, the shaft which causes actuation of said stripping blades.

The operation of the emergency control system to this point will now be described. The rise of detector 195 is arranged to cause a pivoting of main detector shaft 601 and consequently pivoting of actuating finger 619 just as pickup pins 171 arrive at the carbon sheet pickup station, and consequently if a paper sheet fails to arrive at the paper sheet pickup station, the emergency control system commences functioning as the pickup pins 171 reach the carbon sheet pickup station and will remain in operation for the length of the cam rise on detector cam 195. The length of the rise is such that the emergency control system is inactivated at approximately the time that pickup pins 171 reach stripper blades 263. As previously mentioned, the carbon sheet pickup head is swung down against the top of the carbon stack at a time when pickup pins 171 are passing from the paper sheet pickup station to the stripper blades 263.

Assume that a set of properly collated sheets has just been stripped and the pickup pins are continuing around through the remainder of the stripping revolution of drum 57. If the first paper sheet of the next set of sheets to be collated does not arrive at the paper sheet pickup station, the emergency control system will be activated as the pickup pins reach (during the end of the stripping revolution) the carbon sheet pickup station. No carbon sheet has been picked up during the beginning of the stripping revolution because the regular control system prevented head 179 from picking up a carbon sheet. Now, as the pickup pins approach the paper sheet pickup station (no paper sheet being present) the regular control system will be unlatched, but the emergency control system will remain in control and, by holding bleeder valve 551 open, will prevent the pickup of a carbon sheet by head 179 which would otherwise occur at a time during the passage of the pickup pins from the pickup station to the stripper blades 263.

Head 179 will be swung upwardly bare and roller 605 rides off the rise on cam 195 to inactivate the emergency control system. As the pickup pins continue their travel they soon pass the bare head 179. If a paper sheet has now arrived at the paper sheet pickup station, such sheet will be picked up by pickup pins 171. Since the emergency control system is now inactivated, a carbon sheet will now be picked up by head 179 and disposed in a position to be picked up by pickup pins 171 when the pins subsequently pass the carbon sheet pickup station.

If the second paper sheet, instead of the first paper sheet, fails to arrive at the paper sheet pickup station, the emergency control system operating similarly to the above-described manner, prevents the picking up of an unwanted carbon sheet to thereby ensure the proper collating of a set of sheets.

Also operated when control arm 621 is rocked is an arrangement for inactivating the drive to cycle plate 233. Referring to Figs. 8, 9 and 16, there is shown a connecting rod 635 pivoted at its opposite ends to control arm 621 and an arm 637, the latter being secured to a shaft 639 which rotatably extends through side frame members 53 and 55. On the work side end of shaft 639 is a latch arm 641 (see Fig. 9) having a step 643 formed on the lower end thereof normally disposed to laterally clear a stop lug 645 fixed to or formed integrally with bell crank 239, which has been previously mentioned. However, when control arm 621 is rocked, latch arm 641 is swung counterclockwise from the full line position shown in Fig. 9 to the broken line position to dispose the step 643 thereof in the path of upward movement of lug 645. Bell crank 239 and, therefore, lug 645 are normally oscillated, by the engagement of follower roller 243 with cam 245, from the broken line position shown in Fig. 9 to the full line position shown. However, engagement of step 643 with lug 645 prevents upward movement of lug 645 and, therefore, clockwise pivoting movement of bell crank 239, and thus inactivates driving pawl 237. Therefore, cycle plate 233 remains stationary, until latch arm 641 is tripped, to delay the commencement of the stripping revolution of drum 57 until the defect in sheet feeding has been remedied.

Such tripping and activation of all of the inactivated mechanisms will occur upon arrival of a new paper sheet which will raise finger 615 and, therefore, finger 619 so that the latter clears step 625 upon the next oscillation of shaft 601. Therefore, arm 441 (see Fig. 11) will be held in its inoperative position by spring 447 and, therefore, cause a closing of valve 551 and activation of the drive to the glue applicator.

The emergency control system also includes an arrangement for inactivating the proper mechanisms of the machine upon the failure of the carbon sheet pickup head 179 to pick up a carbon sheet. This arrangement will now be described. Shaft 607 carries a second sleeve 651 (see Fig. 36), which carries a short finger 653 of a length substantially equal to the length of finger 619, and a relatively long finger 655 (see Figs. 30 through 35). Finger 653 also normally moves back and forth above the upper end of control arm 621 upon operation of shaft 601. To so dispose finger 653, long finger 655 rests on the upper end of a piston rod 657, the latter being fixed to a piston 659 disposed in a cylinder 661, the latter being formed in valve body 571 (see Fig. 14). Piston 659 is urged upwardly by a compression spring 663 contained in cylinder 661. The cylinder communicates with passage 575 by means of a passage 665. A bleeder port 667 is formed in the head end of cylinder 661.

It will be appreciated that only when the face of pickup head 179 is against a carbon sheet, a vacuum is created in passage 575. Therefore, if the supply of carbon sheets is exhausted or if the head fails to pick up a sheet, piston 659 will not be forced downwardly by atmospheric pressure acting through port 667 (as would normally ocur) and, therefore, short finger 653 will not be raised to its upper level, as it would be if piston rod 657 descended and consequently finger 653 will engage step 625 on control arm 621 and rock said arm. Rocking of control arm 621 causes the inactivation of the glue applicator and the cycle plate, and also the paper sheet feeding means by an arrangement to be presently described.

Figure 30:
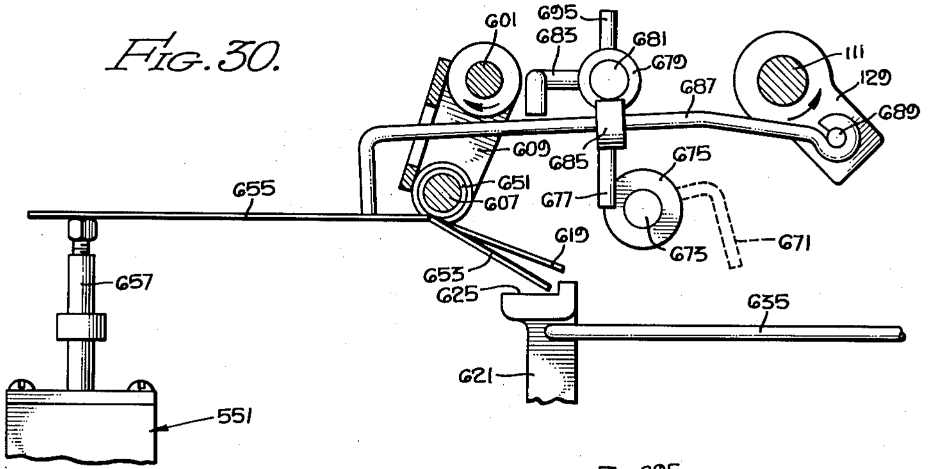
Figs. 30 through 35 are diagrammatic views of part of the emergency control system for the machine and showing the parts in successive stages of operation.
Figure 31:
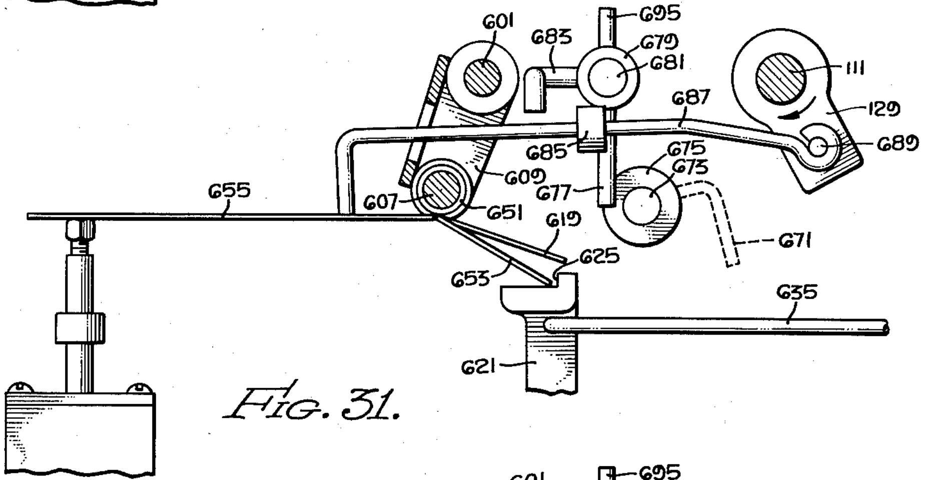
Figure 32:
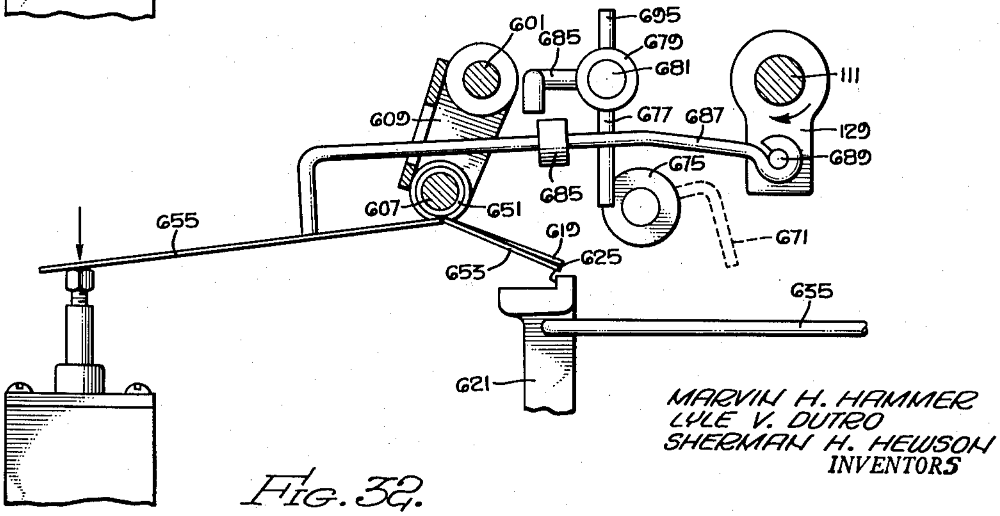

The just described series of operations are depicted in Figs. 30 through 35. Figs. 30 through 32 show the normal operation of the detector system when the pickup head 179 is picking up carbon sheets in the usual fashion. It is apparent that although finger 653 is in the path of step 625 in Figs. 30 and 31, it will be raised to clear said step because a vacuum, created in the vacuum line because of the engagement and pick up of a carbon sheet by head 179, will cause piston rod 657 to descend to the position shown in Fig. 2, and long finger 655 will follow such movement to effect such raising of finger 653.

Figures 33, 34, 35:
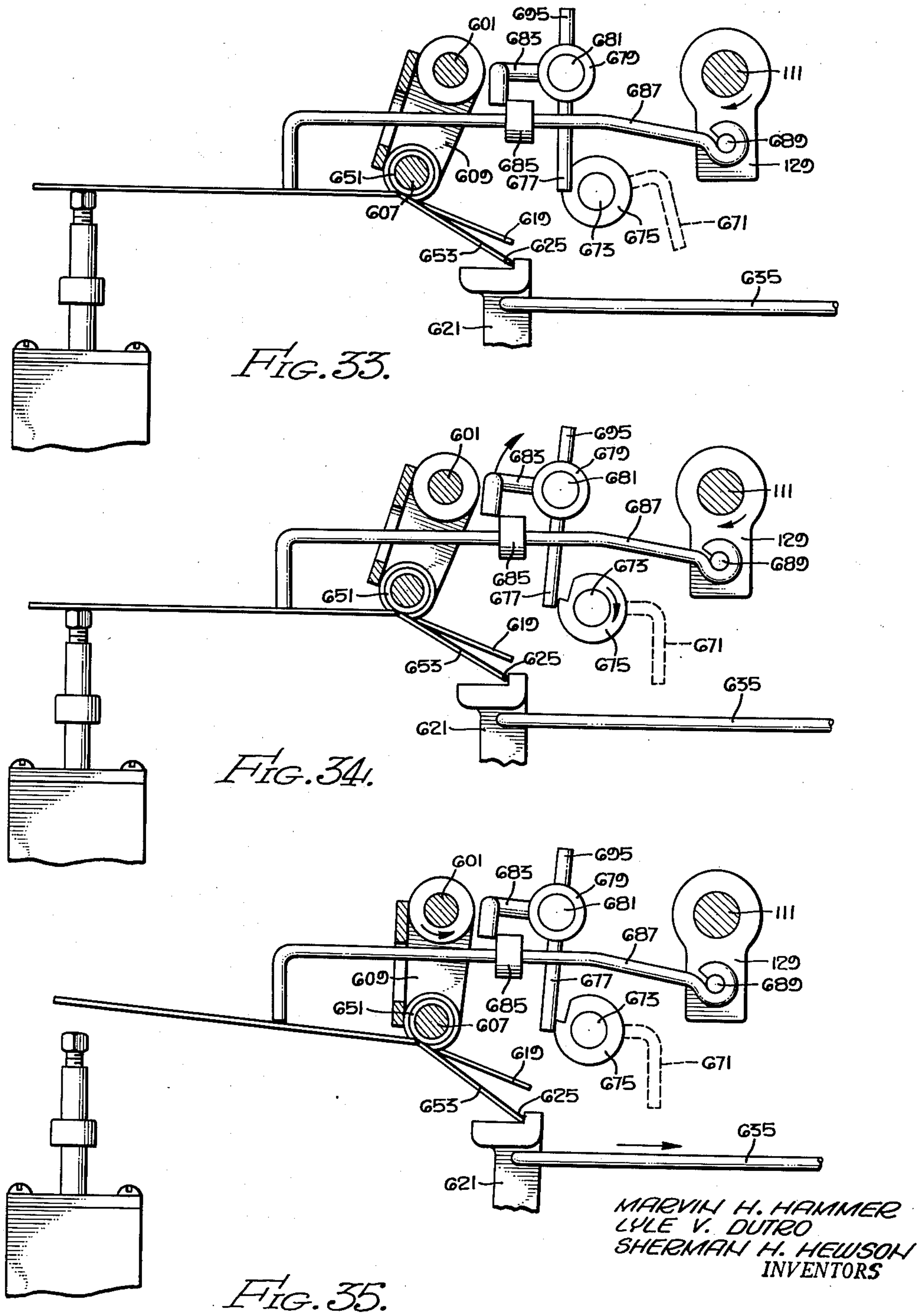

Figs. 33 through 35 show the condition of the parts when head 179 fails to pick up a sheet. It is apparent from Fig. 34 that finger 653 remains at a lower level and engages step 625 to rock arm 621 upon further forward movement of finger 653.

The arrangement for inactivating the paper sheet feeding means will now be explained. At the outset, it might be explained that the timing and releasing gates are not affected by operation of the emergency control system.

Referring to Figs. 3, 8 and 30 through 35, there is shown an auxiliary gate 671 fixed to a shaft 673, the latter being journaled in auxiliary frame 113. Auxiliary gate 671 is designed to be dropped when head 179 fails to pick up a carbon sheet to prevent the next paper sheet from advancing to a position to be picked up by pins 171 on drum 57.

The gear side end of shaft 673 has a notched collar 675 thereon engaged by a latch pin 677, the latter being fixed to a collar 679 which is rotatably mounted on a shaft 681 carried by auxiliary frame 113. Latch pin 677, as the parts are shown in Fig. 30, latches auxiliary gate 671 in its upward inoperative position.

To trip latch pin 677 upon a failure of head 179 to pick up a carbon sheet, there extends from collar 679 a bent tripping finger 683 adapted to be engaged by a collar 685 which is fixed on a tripping rod 687. At one end, rod 687 is pivoted at 689 to arm 129, previously referred to in another connection. At its opposite end, rod 687 is bent downwardly so as to rest on long finger 655.

It follows from the above description that if no carbon sheet is picked up, rod 687 will remain elevated as shown in Figs. 34 and 35, and upon movement of arm 129 (caused by engagement of the rise on cam 119 with follower roller 117), collar 685 will engage finger 683 and trip pin 677 to allow dropping of auxiliary gate 671. However, normally rod 657 will descend to the position shown in Fig. 32, at carbon pickup time so that collar 685 will merely pass under tripping finger 683, and auxiliary gate 671 will remain elevated. When a carbon sheet is subsequently picked up, the inactivated mechanisms will be activated because detector piston 659 will descend so that finger 653 misses step 625.

For stopping the operation of paper sheet conveying belts 71 when the emergency control system is actuated, there is provided on collar 679 an upstanding finger 693, see Fig. 8, adapted to close a normally open microswitch 695, the latter being mounted on auxiliary frame 113. Microswitch 695 is connected by leads 697 to a solenoid unit generally entitled 699 (see Fig. 29). Solenoid unit 699 is disposed in operative relation to pinch brake type pulley unit 87 and when said solenoid unit is supplied with electrical energy upon the closing of switch 695, it functions to disengage the drive through the pulley unit to the conveying belts. This action prevents bucking of the paper sheets in the belt.

By the present invention, a collating machine has been provided wherein a plurality of sheets can be picked up and registered with one another and bonded together in a predetermined relationship. The present invention provides a construction particularly adapted, though not limited to, the manifolding of sheets in which the alternate sheets comprise carbon sheets. An emergency control system has been incorporated in the machine to prevent improper manifolding of sheets upon the failure of a paper sheet to arrive at pickup position or the failure of proper feeding of a carbon sheet. Other advantages of our construction have been set out hereinbefore.

While we have shown the preferred form of our invention, it is to be understood that various changes may be made in its construction by those skilled in the art without departing from the spirit of the invention as defined in the appended claims.

Having thus described my invention, what I claim and desire to secure by Letters Patent is:

1. A collating machine comprising a rotatable drum, primary sheet feeding means for feeding sheets to the drums at one station, secondary sheet feeding means for feeding sheets to the drum at a second station circumferentially spaced from the first station, means on the drum for picking up a succession of sheets from the feeding means, means for driving said primary and secondary sheet feeding means in timed relation with the rotation of said drum whereby a sheet from the secondary feeding means will be interlaid between successive sheets from the primary feeding means, means for removing accumulated groups of sheets from the drum after a predetermined number of revolutions thereof, and means for rendering said secondary sheet feeding means inoperative on the last revolution of said predetermined number of revolutions.

2. A collating machine comprising a rotatable drum, primary and secondary sheet feeding means for feeding sheets to the drum at circumferentially spaced stations, means on the drum for picking up a succession of sheets from said feeding means, means for driving said primary and secondary sheet feeding means in timed relation with the rotation of said drum whereby a sheet from the secondary feeding means will be interlaid between successive sheets from the primary feeding means, means for securing the sheets together along adjacent edge portions thereof as they are being accumulated on the drum, means for periodically stripping accumulated groups of sheets from the drum after a predetermined number of revolutions thereof, and means for rendering said secondary sheet feeding means inoperative on the last revolution of said predetermined number of revolutions.

3. A collating machine comprising a rotatable drum, primary and secondary sheet feeding means for feeding sheets to the drum at circumferentially spaced stations, means on the drum for picking up a succession of sheets from the primary and secondary feeding means with a sheet from the secondary feeding means interlaid between successive sheets from the primary feeding means, means for driving said primary feeding means in timed relation with the rotation of said drum, means for driving said secondary feeding means in timed relation with both the rotation of said drum and the operation of said primary feeding means, whereby the leading edge of the sheet from said secondary feeding means will be offset in a trailing direction from the leading edges of the sheets from the primary feeding means, and means for adhesively joining the sheets along their offset edges as they are being accumulated upon the drum.

4. A collating machine comprising a rotatable drum, primary and secondary sheet feeding means for feeding sheets to the drum at circumferentially spaced stations, means on the drum for picking up a succession of sheets from the primary and secondary feeding means with a sheet from the secondary feeding means interlaid between successive sheets from the primary feeding means, means for driving said primary feeding means in timed relation with the rotation of said drum, means for driving said secondary feeding means in timed relation with both the rotation of said drum and the operation of said primary feeding means, whereby the leading edge of the sheet from said secondary feeding means will be offset in a trailing direction from the leading edges of the sheets from the primary feeding means, means for adhesively joining the sheets along their offset edges as they are being accumulated upon the drum, and means for periodically stripping accumulated groups of sheets from the drum.

5. A collating machine comprising a rotatable drum, primary and secondary sheet feeding means for feeding sheets to the drum at stations spaced circumferentially relative thereto, means for picking up a succession of sheets from the feeding means with a sheet from the secondary feeding means interlaid between successive sheets from the primary feeding means, means for driving said primary feeding means in timed relation with the rotation of said drum, means for driving said secondary feeding means in timed relation with both the rotation of said drum and with the operation of said primary feeding means whereby one edge of said interlaid sheet will be offset out of registration with the sheets from the primary feeding means, and means for applying adhesive to the offset edge portion of the sheets as they are being accumulated on the drum.

6. A collating machine comprising a rotatable drum, primary and secondary sheet feeding means for feeding sheets to the drum at stations spaced circumferentially relative thereto, means for picking up a succession of sheets from the feeding means with a sheet from the secondary feeding means interlaid between successive sheets from the primary feeding means, means for driving said primary feeding means in timed relation with the rotation of said drum, means for driving said secondary feeding means in timed relation with both the rotation of said drum and with the operation of said primary feeding means whereby one edge of said interlaid sheet will be offset out of registration with the sheets from the primary feeding means, and means for applying adhesive simultaneously to the offset edge portions of the secondary sheet and the immediately preceding primary sheet before the succeeding primary sheet is picked up.

7. A collating machine comprising a rotatable drum, primary and secondary sheet feeding means for feeding sheets to the drum at stations spaced circumferentially relative thereto, means for picking up a succession of sheets from the feeding means with a sheet from the secondary feeding means interlaid between successive sheets from the primary feeding means, means for driving said primary feeding means in timed relation with the rotation of said drum, means for driving said secondary feeding means in timed relation with both the rotation of said drum and with the operation of said primary feeding means whereby one edge of said interlaid sheet will be offset out of registration with the sheets from the primary feeding means, means for applying adhesive simultaneously to the offset edge portions of the secondary sheet and the immediately preceding primary sheet before the succeeding primary sheet is picked up, and means for periodically stripping accumulated groups of sheets from the drum.

8. A collating machine comprising a rotatable drum, primary and secondary sheet feeding means for feeding sheets to the drum at stations spaced circumferentially relative thereto, means for picking up a succession of sheets from the feeding means with a sheet from the secondary feeding means interlaid between successive sheets from the primary feeding means, means for driving said primary feeding means in timed relation with the rotation of said drum, means for driving said secondary feeding means in timed relation with both the rotation of said drum and with the operation of said primary feeding means whereby one edge of said interlaid sheet will be offset out of registration with the sheets from the primary feeding means, means for applying adhesive simultaneously to the offset edge portions of the secondary sheet and the immediately preceding primary sheet before the succeeding primary sheet is picked up, means for periodically stripping accumulated groups of sheets from the drum, and means for varying the number of sheets accumulated on the drum between stripping operations.

9. A collating machine comprising a rotatable drum provided with means for picking up and accumulating a succession of sheets from circumferentially spaced stations as the drum is rotated therepast, primary sheet feeding means for feeding sheets to one station, said primary feeding means including a releasing gate operated in timed relation to the movement of the pickup means for releasing sheets singly thereto, and also including a timing gate for passing sheets singly to the releasing gate in timed relation to its releasing action, a secondary sheet feeding means operable for feeding sheets to the second station, said secondary sheets being picked up and accumulated between successive sheets from the primary feeding means, means for periodically stripping accumulated sheets from the drum after a predetermined number of revolutions of said drum, and means for rendering said sheet secondary feeding means inoperative during the stripping revolution of said drum.

10. A collating machine comprising a rotatable drum provided with pickup means for picking up and accumulating sheets from spaced pickup stations, primary feeding means for delivering sheets to one station, secondary sheet feeding means for delivering sheets to a second feeding station said sheets being interlaid between and accumulated with successive sheets picked up from the primary feeding means, means for periodically stripping accumulated sheets from the drum after a predetermined number of revolutions of said drum, means for rendering said secondary sheet feeding means inoperative during the stripping revolution of said drum, and means for inactivating either feeding means if a sheet is not fed by the other feeding means.

11. A collating machine comprising a rotatable drum provided with pickup means for picking up and accumulating sheets from spaced pickup stations, primary feeding means for delivering sheets to one station, secondary sheet feeding means for delivering sheets to a second feeding station said sheets being interlaid between and accumulated with successive sheets picked up from the primary feeding means, means for inactivating either feeding means if a sheet is not fed by the other feeding means, means periodically stripping accumulated groups of sheets from the drum after a predetermined number of revolutions of said drum, means for rendering said secondary sheet feeding means inoperative on the stripping revolution of said drum, and means for inactivating the stripping means upon inactivation of either sheet feeding means.

12. A collating machine comprising a rotatable drum provided with pickup means operable to pick up sheets from spaced stations successively, separate means for feeding sheets to the pickup stations, adhesive applying means engaging edge portions of the sheets as they are accumulated on the drum for adhesively uniting the sheets in groups of predetermined number, stripping means for removing accumulated sheets from the drum, and means for timing the operation of the stripping means to remove the sheets when a predetermined number has been accumulated.

13. A collating machine comprising a rotatable drum provided with pickup means operable to pick up sheets from spaced stations successively, separate means for feeding sheets to the pickup stations, adhesive applying means engaging edge portions of the sheets as they are accumulated on the drum for adhesively uniting the sheets in groups of predetermined number, stripping means for removing accumulated sheets from the drum, means for timing the operation of the stripping means to remove the sheets when a predetermined number has been accumulated, and means for preventing the feeding of sheets during the stripping operation.

14. A collating machine comprising a rotatable drum provided with pickup means operable to pick up sheets from spaced stations successively, separate means for feeding sheets to the pickup stations, adhesive applying means engaging edge portions of the sheets as they are accumulated on the drum for adhesively uniting the sheets in groups of predetermined number, stripping means for removing accumulated sheets from the drum, means for timing the operation of the stripping means to remove the sheets when a predetermined number has been accumulated, and means for inactivating the adhesive applying means and the companion feeding means when either feeding means fails to feed a sheet to its pickup station.

15. A collating machine comprising a rotatable drum provided with pickup means operable to pick up succesive sheets alternately from spaced pickup stations, separate sheet feeding means for feeding sheets singly to the pickup stations, means for rotating the drum through cycles including a cycle for stripping accumulated sheets from the drum immediately following a predetermined number of pickup cycles, and means for inactivating the feeding means during the stripping cycle.

16. A collating machine comprising a rotatable drum provided with pickup means operable to pick up successive sheets alternately from spaced pickup stations, separate sheet feeding means for feeding sheets singly to the pickup stations, means for rotating the drum through cycles including a cycle for stripping accumulated sheets from the drum immediately following a predetermined number of pickup cycles, means for applying adhesive to edge portions of sheets picked up during each pickup cycle, and means for inactivating the feeding means and the adhesive applying means during the stripping cycle.

17. A collating machine comprising a rotatable drum provided with pickup means operable to pick up successive sheets alternately from spaced pickup stations, separate sheet feeding means for feeding sheets singly to the pickup stations, means for rotating the drum through cycles including a cycle for stripping accumulated sheets from the drum immediately following a predetermined number of pickup cycles, means for selectively regulating the number of pickup cycles through which the drum is rotated between stripping cycles, and means for inactivating the companion feeding means to prevent feeding of a sheet to the succeeding station in event the drum fails to pick up a sheet from either station during a pickup cycle.

18. A collating machine comprising a rotatable drum provided with pickup means operable to pick up successive sheets alternately from spaced pickup stations, separate sheet feeding means for feeding sheets singly to the pickup stations, means for rotating the drum through cycles including a cycle for stripping accumulated sheets from the drum immediately following a predetermined number of pickup cycles, means for selectively regulating the number of pickup cycles through which the drum is rotated between stripping cycles, means for inactivating the companion feeding means to prevent feeding of a sheet to the succeeding station in event the drum fails to pick up a sheet from either station during a pickup cycle, and means for delaying the next stripping cycle to compensate for any inactivation of the feeding means during a pickup cycle.

19. A collating machine comprising a rotatable drum provided with pickup means operable to pick up successive sheets alternately from spaced pickup stations, separate sheet feeding means normally feeding sheets singly to the pickup stations, means for rotating the drum through a predetermined number of cycles for picking up and accumulating a plurality of sheets immediately followed by a stripping cycle, means for timing the stripping cycle to occur after a predetermined number of pickup cycles, means for applying adhesive to edge portions of sheets picked up by the drum during each pickup cycle, means normally inactivating the feed means and adhesive applying means during the stripping cycle, and emergency means for inactivating the associated sheet feeding means, adhesive applying means and cycle timing means until each pickup sequence is complete in event a sheet is not picked up at either station.

20. A collating machine comprising a drum, pickup means carried by the drum, feed means for separately feeding sheets to pickup stations circumferentially spaced with respect to the drum, means for rotating the drum through a predetermined number of pickup cycles for accumulating sheets picked up in alternate sequence from the pickup stations and through a stripping cycle immediately thereafter for removing the accumulated sheets from the drum, means for timing the stripping cycle with respect to the selected predetermined number of pickup cycles, and means for controlling the timing means to delay the stripping cycle so as to compensate for variation in the number of rotations of the drum to pick up a predetermined number of sheets in prescribed sequence.

21. A collating machine comprising a drum, pickup means carried by the drum, feed means for separately feeding sheets singly to pickup stations circumferentially spaced around the drum, means for rotating the drum in cycles for picking up sheets in alternate sequence from the stations with a single sheet from one station interlaid between single sheets from the other station, stripping means mounted in association with the drum for periodically removing the sheets from the drum in accumulated groups, means actuated in timed relation with the rotation of the drum for activating the stripping means, and means for varying the timing to obtain a desired number of sheets in the group stripped.

22. A collating machine having a pickup drum operable to pick up sheets singly in alternate sequence from two spaced pickup stations on each revolution of the drum, sheet feeding means at each of said pickup stations, means for driving said sheet feeding means in timed relation with said drum and with each other whereby the sheets will be picked up with edge portions of successive sheets offset from a registering relation, and means for applying adhesive to the sheets along the offset edge portions of the sheets as the drum is rotated through each cycle.

23. A collating machine having a pickup drum operable to pick up sheets singly in alternate sequence from two spaced pickup stations on each revolution of the drum, sheet feeding means at each of said pickup stations, means for driving said sheet feeding means in timed relation with said drum and with each other whereby the sheets will be picked up with edge portions of successive sheets offset from a registering relation, and an adhesive applicator mounted adjacent the drum and provided with a rotatable member operable in timed relation to the rotation of the drum for applying adhesive along the offset edge portions of sheets picked up by the drum and moved past the applicator during a pickup cycle of the drum.

24. A collating machine having a pickup drum operable to pick up sheets singly in alternate sequence from two spaced pickup stations on each revolution of the drum, sheet feeding means at each of said pickup stations, means for driving said sheet feeding means in timed relation with said drum and with each other whereby the sheets will be picked up with edge portions of successive sheets offset from a registering relation, and an adhesive applicator mounted adjacent the drum and provided with a rotatable member operable in timed relation to the rotation of the drum for applying adhesive along the offset edge portions of sheets picked up by the drum and moved past the applicator during a pickup cycle of the drum, and means for inactivating the adhesive applying means during periods when the sheet feeding sequence is interrupted.

25. A collating machine comprising a rotatable pickup drum, a set of pickup pins pivotally mounted upon the drum, means for rotating the drum for moving the pins to pick up sheets in alternate sequence from two spaced pickup stations on each revolution of said drum, normally inactivated stripping means for periodically removing accumulated sheets from the pins, means for activating said stripping means after a predetermined number of revolutions of the drum, and means actuated in timed relation to the drum for pivotally moving the pins from a pickup to a releasing position during the stripping revolution thereof.

26. A collating machine comprising a rotatable pickup drum, a set of pickup pins pivotally mounted upon the drum, means for rotating the drum for moving the pins to pick up sheets in alternate sequence from two spaced pickup stations on each revolution of said drum, normally inactivated stripping means for periodically removing accumulated sheets from the pins, means for activating said stripping means after a predetermined number of revolutions of the drum, and delivery means aligned with the stripping means and provided with gripping means engaging the groups of sheets as they are stripped from the drum.

27. A collating machine comprising a rotatable pickup drum, a set of pickup pins pivotally mounted upon the drum, means for rotating the drum for moving the pins to pick up sheets in alternate sequence from two spaced pickup stations on each revolution of said drum, normally inactivated stripping means for periodically removing accumulated sheets from the pins, means for activating said stripping means after a predetermined number of revolutions of the drum, delivery means mounted in association with the stripping means for transporting accumulated groups of sheets away from the stripping means, and means for slitting the sheets as they are carried from the machine by the delivery means.

28. In an apparatus of the class described, a rotary drum, a feed table having conveying means for conveying sheets toward the drum, means for holding each sheet adjacent the drum and then releasing the same for pickup by the drum, a sheet stack holder, a vacuum sheet pickup mechanism for picking up the top sheet from the stack and presenting the same for pickup by the drum, means for applying adhesive material to the sheets on the drum, and means for stripping accumulated sheets from the drum.

29. In an apparatus of the class described, a rotary drum, a feed table having conveying means for conveying sheets toward the drum, means for holding each sheet adjacent the drum and then releasing the same for pickup by the drum, a sheet stack holder, and a vacuum sheet pickup mechanism for picking up the top sheet from the stack and presenting the same for pickup by the drum, said vacuum pickup mechanism and the first named means being operable to dispose their respective sheets at different predetermined distances from the drum so that adjacent sheets picked up by the drum are staggered with relation to one another.

30. In an apparatus of the class described, a rotary drum, a feed table having conveying means for conveying sheets toward the drum, means for holding each sheet adjacent the drum and then releasing the same for pickup by the drum, a sheet stack holder, and a vacuum sheet pickup mechanism for picking up the top sheet from the stack and presenting the same for pickup by the drum, said vacuum pickup mechanism and the first named means being operable to dispose their respective sheets at different predetermined distances from the drum so that adjacent sheets picked up by the drum are staggered with relation to one another, and means for substantially simultaneously applying adhesive material to a pair of staggered sheets on the drum.

31. In an apparatus of the class described, a rotary drum, a feed table having conveying means for conveying sheets toward the drum, means for holding each sheet adjacent the drum and then releasing the same for pickup by the drum, a sheet stack holder, a vacuum sheet pickup mechanism for picking up the top sheet from the stack and presenting the same for pickup by the drum, and means between the vacuum pickup mechanism and the first named means for substantially simultaneously applying adhesive material to a pair of staggered sheets, means for stripping accumulated sheets from the drum, and means for temporarily inactivating the vacuum pickup mechanism and the adhesive material applying means upon the failure of a sheet to appear at the holding means, and also being operable to inactivate the adhesive material applying means and prevent further pickup of sheets from the feed table by the drum upon the failure of the vacuum pickup mechanism to pick a sheet.

32. In an apparatus of the class described, a rotary sheet pickup drum, a longitudinal row of sheet pickup needles mounted on the drum for forward and rearward pivotal movements, and adapted in their forward positions to pick up a sheet and in their rearward positions to be stripped of sheets, means for maintaining the needles in their forward positions during a sheet pickup operation, means for causing rearward pivotal movement of the needles at a time when the needles are to be stripped, means for feeding sheets to the drum, means for applying adhesive material to the sheets on the drum to cause accumulated sheets to adhere together, and means for inactivating the last named means upon the failure of the drum to pick up a sheet.

33. In an apparatus of the class described, a rotary sheet pickup drum, a longitudinal row of sheet pickup needles mounted on the drum for forward and rearward pivotal movements, and adapted in their forward positions to pick up a sheet and in their rearward positions to be stripped of sheets, means for maintaining the needles in their forward positions during a sheet pickup operation, means for causing rearward pivotal movement of the needles at a time when the needles are to be stripped, means including a cycle plate for periodically activating the last named means, means for feeding sheets to the drum, means for applying adhesive material to the sheets on the drum to cause accumulated sheets to adhere together, means for inactivating the last named means upon the failure of the drum to pick up a sheet, means for rotating the drum, and means disposed adjacent the drum and operable in timed relation to rotation thereof for stripping sheets from the needles when the needles are pivoted to their rearward positions.

34. In an apparatus of the class described, a sheet stack elevator, means for incrementally elevating the elevator including a ratchet wheel connected to the elevator to elevate the same when the wheel is rotated, a driving pawl for incrementally rotatively advancing the wheel, means for constantly operating the pawl, means for disengaging the pawl from the ratchet wheel upon elevation of the top of the stack of sheets above a predetermined level and for causing re-engagement thereof upon the removal of sufficient sheets to lower the top of the stack below a second and lower predetermined level, a rotary sheet pickup drum, means for picking up a sheet from the top of the stack of sheets and presenting it to the drum, other feeding means for feeding other sheets to the drum for pickup by the drum, means for applying adhesive material to the sheets on the drum to cause the sheets to adhere together, and means for stripping accumulated sheets from the drum.

35. In an apparatus of the class described, a vacuum sheet pickup mechanism for picking up a sheet, a rotary drum for picking up sheets from the pickup mechanism, means for applying adhesive material to the sheets on the drum, said mechanism including a vacuum supply line normally containing a relatively low vacuum but containing a relatively high vacuum when a sheet is picked up, an emergency control mechanism connected to said line and including a pressure responsive device subjected to atmospheric pressure on one side and to the vacuum in the line on the other and operable when a sheet is picked up to move from a first position to a second position under the influence of a differential pressure, and means operatively connected to said pressure responsive device and operable during the sheet pickup time to inactivate said adhesive material applying means whenever the pressure responsive device is in its first position at pickup time, whereby normally the pressure responsive device is disposed in its second position during sheet pickup time, but whenever a sheet is not picked up, the pressure responsive device remains in its first position and causes operation of said means and inactivation of said adhesive material applying means.

36. In an apparatus of the class described, a rotary sheet pickup drum having means for picking up sheets fed to the drum, a first sheet feeding means for feeding sheets in successive fashion to the drum, a second sheet feeding means for feeding other sheets in successive fashion to the drum, whereby the drum picks up sheets from the feeding means in successive fashion, said second sheet feeding means including a vacuum sheet pickup mechanism for picking up a sheet and presenting the same to the drum, said mechanism including a vacuum supply line normally containing a relatively low vacuum but containing a relatively high vacuum when a sheet is picked up, an emergency control mechanism connected to said line and including a pressure responsive device subjected to atmospheric pressure on one side and to the vacuum in said line on the other and operable when a sheet is picked up to move from a first position to a second position under the influence of a differential pressure, and means operatively connected to said pressure responsive device and operable during the sheet pickup time to inactivate said first feeding means whenever the pressure responsive device is in its first position at sheet pickup time, whereby normally the pressure responsive device is in its second position during sheet pickup time, but whenever a sheet is not picked up, the pressure responsive device remains in its first position and thus causes operation of said operatively connected means which inactivates said first feeding means.

37. In an apparatus of the class described, a rotary sheet pickup drum having means for picking up sheets fed to the drum, a first sheet feeding means for feeding sheets in successive fashion to the drum, a second sheet feeding means for feeding other sheets in successive fashion to the drum, whereby the drum picks up sheets from the feeding means in successive fashion, means for applying adhesive material to sheets on the drum, means for removing accumulated sheets from the drum, said second sheet feeding means including a vacuu sheet pickup mechanism for picking up a sheet and presenting the same to the drum, said mechanism including a vacuum supply line normally containing a relatively low vacuum but containing a relatively high vacuum when a sheet is picked up, an emergency control mechanism connected to said line and including a pressure responsive device subjected to atmospheric pressure on one side and the vacuum in the supply line on the other and being operable when a sheet is picked up to move from a first position to a second position under the influence of a differential pressure, means operatively connected to said pressure responsive device and operable during the sheet pickup time to inactivate said adhesive material applying means and said first feeding means whenever the pressure responsive device is in its first position at pickup time.

38. In an apparatus of the class described, a sheet stack elevator, means for incrementally elevating the elevator including a ratchet wheel connected to the elevator to elevate the same when the wheel is rotated, a driving pawl for incrementally rotatively advancing the wheel, means for constantly operating the pawl, means for disengaging the pawl from the ratchet wheel upon elevation of the top of the stack of sheets above a predetermined level and for causing re-engagement thereof upon the removal of sufficient sheets to lower the top of the stack below a second and lower predetermined level, a rotary sheet pickup drum, means for picking up a sheet from the top of the stack of sheets and presenting it to the drum, other feeding means for feeding other sheets to the drum for pickup by the drum, means for applying adhesive material to the sheets on the drum to cause the sheets to adhere together, means for stripping accumulated sheets from the drum, an endless carrier adjacent the drum, a normally closed gripper on the carrier, oscillating means engaging the carrier to reciprocate the gripper toward and away from the drum, means for temporarily opening the gripper at a point adjacent the drum to enable it to grip sheets stripped from the drum, and slitting means in the path of travel of the sheets and through which the sheets are drawn during travel of the gripper to slit the sheets into several portions.

References Cited in the file of this patent

UNITED STATES PATENTS

| | | |
|---|---|---|
| 1,046,095 | McCain | Dec. 3, 1912 |
| 1,306,399 | Barber | June 10, 1919 |
| 1,392,469 | Wood | Oct. 4, 1921 |
| 1,717,231 | Krell | June 1, 1929 |
| 1,853,320 | Roesen | Apr. 12, 1932 |
| 2,007,886 | Stussi | July 9, 1935 |
| 2,255,777 | Jones | Sept. 16, 1941 |
| 2,288,755 | Taggart | July 7, 1942 |
| 2,300,657 | Dudley | Nov. 3, 1942 |
| 2,392,976 | Curmode | Jan. 15, 1946 |
| 2,558,405 | Weinstein | June 26, 1951 |
| 2,568,224 | Didde | Sept. 18, 1951 |
| 2,621,040 | Rinehart | Dec. 9, 1952 |
| 2,627,406 | Mestre | Feb. 3, 1953 |